(12) United States Patent
Bacino et al.

(10) Patent No.: US 7,306,729 B2
(45) Date of Patent: Dec. 11, 2007

(54) POROUS PTFE MATERIALS AND ARTICLES PRODUCED THEREFROM

(75) Inventors: John E. Bacino, Landenberg, PA (US); Alex R. Hobson, Elkton, MD (US); Jason J. Strid, Elkton, MD (US)

(73) Assignee: Gore Enterprise Holdings, Inc., Newark, DE (US)

( * ) Notice: Subject to any disclaimer, the term of this patent is extended or adjusted under 35 U.S.C. 154(b) by 0 days.

(21) Appl. No.: 11/334,243

(22) Filed: Jan. 18, 2006

(65) Prior Publication Data

US 2007/0012624 A1  Jan. 18, 2007

Related U.S. Application Data

(63) Continuation of application No. 11/184,706, filed on Jul. 18, 2005.

(51) Int. Cl.
- B01D 71/26 (2006.01)
- B01D 39/14 (2006.01)
- B29C 55/14 (2006.01)
- B01D 61/00 (2006.01)

(52) U.S. Cl. .................. 210/500.22; 210/500.36; 264/288.4; 264/291; 96/4; 96/10; 95/45

(58) Field of Classification Search .............. 210/650, 210/500.1, 321.6, 500.36, 500.27, 489, 640; 428/319.9, 318.4; 264/288.8, 127, 291, 294; 96/4, 10; 95/45
See application file for complete search history.

(56) References Cited

U.S. PATENT DOCUMENTS

| | | | |
|---|---|---|---|
| 3,953,566 A * | 4/1976 | Gore | 264/505 |
| 4,187,390 A * | 2/1980 | Gore | 174/102 R |
| 4,613,441 A * | 9/1986 | Kohno et al. | 210/500.36 |
| 4,902,423 A * | 2/1990 | Bacino | 210/500.36 |
| 5,362,553 A * | 11/1994 | Dillon et al. | 442/76 |
| 5,403,524 A * | 4/1995 | Burger et al. | 264/424 |
| 5,426,128 A * | 6/1995 | Burger et al. | 521/134 |
| 5,451,453 A * | 9/1995 | Gagnon et al. | 428/305.5 |
| 5,476,589 A * | 12/1995 | Bacino | 210/500.36 |
| 5,547,551 A * | 8/1996 | Bahar et al. | 204/296 |
| 5,599,614 A * | 2/1997 | Bahar et al. | 442/171 |
| 5,834,528 A * | 11/1998 | Tanaka et al. | 521/145 |
| 5,838,406 A * | 11/1998 | McGregor et al. | 349/113 |
| 6,103,172 A * | 8/2000 | Newman et al. | 264/288.8 |
| 6,130,175 A * | 10/2000 | Rusch et al. | 442/77 |
| 6,143,675 A * | 11/2000 | McCollam et al. | 442/221 |
| 6,196,708 B1 * | 3/2001 | Rogers | 362/547 |
| 6,199,979 B1 * | 3/2001 | Hobson et al. | 347/93 |
| 6,235,377 B1 | 5/2001 | Dillon et al. | 428/212 |
| 6,274,043 B1 * | 8/2001 | Newman et al. | 210/500.36 |
| RE37,701 E * | 5/2002 | Bahar et al. | 442/171 |
| 6,541,589 B1 | 4/2003 | Baillie | 527/250 |
| 6,545,589 B1 * | 4/2003 | Fuller et al. | 340/7.22 |
| 6,582,113 B2 * | 6/2003 | Rogers | 362/547 |
| 6,676,993 B2 * | 1/2004 | Klare | 427/245 |
| 6,737,158 B1 * | 5/2004 | Thompson | 428/306.6 |
| 6,824,865 B1 * | 11/2004 | Funaoka et al. | 428/315.5 |
| 6,852,223 B2 * | 2/2005 | Huang et al. | 210/500.36 |

* cited by examiner

*Primary Examiner*—Krishnan S. Menon
(74) *Attorney, Agent, or Firm*—Carol A. Lewis White

(57) ABSTRACT

Novel porous PTFE membranes are described possessing a unique combination of high strength, low flow resistance, and small pore size. Additionally, unique constructions with superior filtration and venting properties incorporating porous PTFE membranes are described.

96 Claims, 6 Drawing Sheets

POROUS PTFE MATERIALS AND ARTICLES PRODUCED THEREFROM

RELATED APPLICATIONS

The present application is a continuation application of U.S. patent application Ser. No. 11/184,706, filed Jul. 18, 2005.

FIELD OF THE INVENTION

The present invention relates to porous PTFE membranes with a combination of high air or liquid permeability and small pore size and filter materials made therefrom.

DEFINITIONS

As used in this application, the term "filtration efficiency" means the percentage of particles within a specified size range captured by a filtration material, or media, at a given flow rate.

As used in this application, the term "flow" means the passage of a fluid through a membrane or filter material. The term "flow rate" means the volume of flow per unit time and the term "flow resistance" means the restriction of flow as results during flow through membranes or media with small pores.

As used in this application, the term "permeability" means the ability to transmit fluids (liquid or gas) through the pores of a membrane or filter material when the material is subjected to a differential pressure across it. Permeability can be characterized by Gurley number, Frazier number, or water flux rate.

As used in this application, the term "pore size" means the size of the pores in porous membranes. Pore size can be characterized by bubble point, mean flow pore size, or water entry pressure, as described in more detail herein.

As used in this application, the term "water entry pressure" means the pressure required to drive water droplets through a membrane, as further described in the test methods contained herein.

BACKGROUND OF THE INVENTION

Ideal filtration membranes possess adequate strength for the intended applications and combine high air or liquid permeability properties with high filtration efficiencies. High permeability or high flow through the membrane for a given pressure drop across the membrane affords lower energy costs due to lower energy loss and more rapid filtration times. Additionally, these features make it possible to install smaller, more cost effective systems. Improved filtration efficiency affords improved capture of contaminants. Typically, optimizing either filtration efficiency or permeability comes at the expense of compromising the other. For example, in order to capture smaller particles, the membrane must possess small pores, but the smaller pore size typically increases flow resistance and therefore decreases the liquid or gas permeability through the membrane. Similarly, increasing flow through the membrane is readily achieved by increasing the pore size of the filter media, but in doing so the membrane captures fewer particles and is less efficient in the capture of smaller particles.

Improvement in the development of filtration media has focused on finding ideal combinations of high permeability, small pore size, and high strength. Expanded PTFE (ePTFE) membranes have enjoyed great success in the fields of liquid and gas filtration. Expanded PTFE membranes are typically hydrophobic unless treated or modified or otherwise altered. Such membranes not only possess high chemical inertness and thermal stability at extremes of temperature, but they also possess high strength.

Methods for processing expanded PTFE and articles made therefrom are taught in U.S. Pat. No. 5,476,589 to Bacino. Bacino teaches very thin articles consisting essentially of microfibrils. This patent enables the processing of high strength PTFE articles possessing small pore sizes and high air permeability not previously obtainable. The articles are made by transversely stretching PTFE, then expanding it in the longitudinal and transverse directions. These materials, albeit having improved filtration performance compared to predecessor membranes, have limitations in their ability to satisfy increasingly demanding commercial needs.

It is well established in the art that increasing the ratio of expansion of PTFE typically increases the pore size of resulting porous expanded articles. The larger pore size results in lower flow resistance through the membranes, but, as noted above, at the expense of filtration efficiencies, especially for smaller particles. Further stretching tends to decrease membrane thickness which can result in a reduction in flow resistance.

Thus, while numerous efforts have been made to improve the filtration characteristics of PTFE membranes, a clear need still exists for thin, strong filtration membranes that provide both small pore size and low flow resistance.

SUMMARY OF THE INVENTION

The present invention is directed to novel porous PTFE membranes possessing a unique combination of high strength, low flow resistance, and small pore size. Further, the present invention is directed to unique high performance filter materials and vent constructions, including those suitable for venting applications, with filtration performance which has been heretofore unachievable.

Porous PTFE membranes of the present invention can be fabricated which exhibit, for example, a combination of Gurley number versus bubble point equal to or below the line defined by the equation log (Gurley)=$5.13 \times 10^{-3}$ (Bubble Point)–1.26 and a surface area of at least 20 m$^2$/g, a combination of a light transmission of a least 50% and a porosity of at least 50%, a matrix tensile strength in two orthogonal directions of at least $1.3 \times 10^5$ MPa$^2$, as well as various combinations of these unique properties. Other membranes of the invention exhibit a Gurley number versus bubble point equal to or below the line defined by the equation log (Gurley)=$5.13 \times 10^{-3}$ (Bubble Point)–1.58, and even equal to or below the line defined by the equation log (Gurley)=$5.13 \times 10^{-3}$ (Bubble Point)–2.02, while still exhibiting a surface area of at least 20 m$^2$/g. Unique performance as measured by water entry pressure versus Gurley number, water flux rate versus bubble point and water flux rate versus mean flow pore size are also achievable with the membranes of the present invention. For example, membranes with a water entry pressure versus Gurley number equal to or above the line defined by the equation WEP=3(Gurley number)+2500 have been achieved. Further, membranes with a water flux rate versus bubble point equal to or above the line defined by the equation log (water flux rate)=$-3.5 \times 10^{-3}$ (bubble point)+1.3 have been made. Further, membranes with a water flux rate versus mean flow pore size equal to or above the line defined by the equation log(water flux rate) =16.9(mean flow pore size)−1.85 are within the scope of the present invention.

In an alternative embodiment of the present invention, articles which include composites of at least one porous PTFE membrane and at least one additional layer may be made. The at least one additional layer may be in the form of membranes, nonwovens, scrims and/or fabrics, depending on the desired characteristics of the final article. For example, it is possible to form such composite articles wherein the composites have a water flux rate versus bubble point equal to or above the line defined by the equation log (water flux rate)=$-3.5 \times 10^{-3}$ (bubble point)+1.3, more preferably equal to or above the line defined by the equation log (water flux rate)=$-3.5 \times 10^{-3}$ (bubble point)+1.6, and even more preferably the line defined by the equation log (water flux rate)=$-3.5 \times 10^{-3}$ (bubble point)+2.0. Alternative composite constructions may include composites of at least one porous PTFE membrane and at least one additional layer where the composite is instantly wettable with water and has a water flux rate versus bubble point equal to or above the line defined by the equation log (water flux rate)=$-0.01 \times 10^{-3}$ (bubble point)+1.3, more preferably equal to or above the line defined by the equation log (water flux rate)=$-0.01 \times 10^{-3}$ (bubble point)+2.48, and even more preferably equal to or above the line defined by the equation log (water flux rate)=$-0.01 \times 10^{-3}$ (bubble point)+5.0.

In a further embodiment of the invention, articles comprising porous PTFE membranes which are instantly wettable with water and which have a water flux rate versus bubble point equal to or above the line defined by the equation log (water flux rate)=$-0.01 \times 10^{-3}$ (bubble point)+1.3, more preferably by the equation log (water flux rate) =$-0.01 \times 10^{-3}$ (bubble point)+2.48, and most preferably by the equation log (water flux rate)=$-0.01 \times 10^{-3}$ (bubble point)+5.0 can be made in accordance with the present invention.

In a further embodiment of the invention, articles comprising porous PTFE membranes having an oil rating of at least 2, more preferably at least 4, and even more preferably at least 5, and a water entry pressure above 500 kPa with a Gurley number up to 350 seconds can be made in accordance with the teachings of the present invention. In a further embodiment, such oleophobic membranes can be made with a water entry pressure above 1250 kPa and a Gurley number up to 200 seconds. In an even further embodiment, such oleophobic membranes can be made with a water entry pressure above 2000 kPa and a Gurley number up to 100 seconds.

In a further embodiment of the invention, articles can be made with porous PTFE membranes having a light transmission of at least 50% and a Gurley versus bubble point equal to or below the line defined by the equation log (Gurley)=$5.13 \times 10^{-3}$ (bubble point)−1.22, more preferably equal to or below the line defined by the equation log (Gurley)=$5.13 \times 10^{-3}$ (bubble point)−1.58, and most preferably equal to or below the line defined by the equation log (Gurley)=$5.13 \times 10^{-3}$ (bubble point)−2.02.

Finally, filtering of fluids utilizing filters incorporating these unique membranes and composites, including venting material as well is contemplated herein.

These and other unique features of the invention are described herein.

DETAILED DESCRIPTION OF THE FIGURES

DETAILED DESCRIPTION OF THE INVENTION

Figure 1:
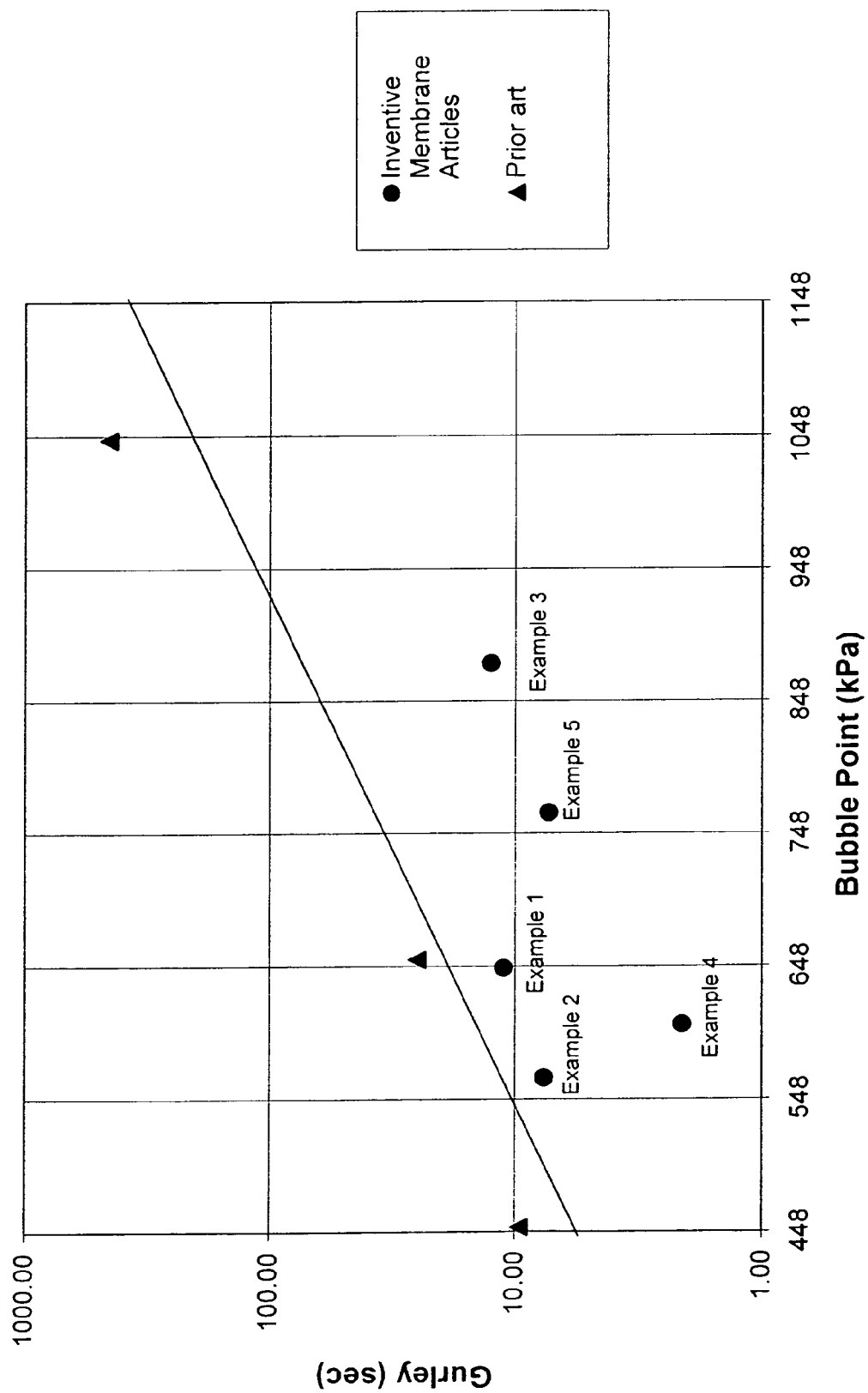
FIG. 1 is a graph depicting Gurley number versus bubble point for porous PTFE membranes made in accordance with examples contained herein.

The porous PTFE articles of the present invention provide the surprising combination of high strength, low flow resistance, and small pore size. These articles fill needs for high-performance filtration media. Prior art materials suffer from either high flow resistance or low filtration efficiency or both in comparison to materials of the present invention. Materials of the present invention provide lower flow resistance with smaller pore size compared to prior art materials. The inventive materials have utility in both liquid and gas filtration applications.

The combination of low flow resistance and high water entry pressure makes the inventive materials suitable for use in gas venting applications, where the material allows gases and vapors to pass through while repelling liquid water or other liquids.

The inventive ePTFE articles can be rendered oleophobic by various techniques, thereby making them fit for use in certain venting applications where the material has high air flow and high water entry pressure and is resistant to penetration by low surface tension fluids like oil.

The inventive membranes can be rendered hydrophilic (water-wettable under little or no pressure) by various techniques making them usable in liquid filtration applications which involve, for example, filtration of aqueous fluids.

The porous PTFE membranes of this invention can be constructed as composite filters or composite vents, for example by layering the membrane with one or more additional layers that may provide support or protection to the membrane. The additional layer or layers can be in the form of one or more porous membranes or more traditional air permeable materials like knits, non-wovens, scrims, woven fabrics, etc. Depending on the end-use requirements, an additional layer or layers may be oriented on only one side or on both sides of the membrane. The additional layer or layers may or may not be bonded to the membrane, depending on the end-use requirements. For example, the membrane and additional layers may be loosely stacked, then held together by appropriate means around a perimeter of the filter, such as by a housing, a frame, a potting compound, an adhesive, or any other suitable means. Alternatively, the additional layer or layers may be attached to the membrane at a relatively few number of sites, e.g., via a suitable adhesive at locations around at least a portion of the perimeter, by a discontinuous lamination adhesive across the surface of the layers, or any other suitable configuration meeting the requirements of the end use application. Suitable adhesives can include, but are not limited to, polypropylenes, polyesters, polyethylenes, PFA, FEP, and other suitable forms of thermoplastics, thermosets, and the like. Benefits of composite filters and vents include, but are not limited to, improved handling of the membrane making it easier to fabricate filter cartridges or vents, improved filtration efficiency in some cases, and the like. In order to retain high flow properties of the membrane when used as a composite filter, the additional layers are typically chosen so as to minimize flow resistance. Also, the composite filters and vents can either be hydrophobic, oleophobic, or hydrophilic depending on the application in which they are used.

It is generally expected based on the teachings of the prior art that the more a PTFE material is expanded, the larger the pore size of the resulting PTFE structure. In the case of the present invention, however, it has been unexpectedly discovered that under certain conditions it is possible to achieve smaller pore sizes by increasing the amount of expansion. Even more surprising, this decrease in pore size is accompanied by an increase in the permeability of the membrane. The process results in a novel membrane structure that increases permeability while decreasing the effective pore size. Furthermore, the resulting membrane possesses high strength.

The unique combination of permeability and pore size properties of membranes of the present invention is demonstrated in the graphs shown in the Figures. In these graphs, permeability is characterized by Gurley number or water flux rate. Increased permeability is manifested by lower Gurley numbers (i.e., less time for a given volume of air to pass through the membrane at a given pressure), higher Frazier numbers (i.e., the flow rate of air through the membrane for a given pressure drop and sample area), and higher water flux rates. Pore size is characterized by the bubble point (BP), mean flow pore size, or water entry pressure (WEP) values. Higher bubble point values (the pressure required to pass a bubble of air through a wetted sample of membrane) and higher WEP values (the pressure required to drive water droplets through a membrane) indicate smaller pore sizes. Test methods for measuring Gurley number, Frazier number, water flux rate, WEP, mean flow pore size, and BP are provided herein in more detail.

Figure 2:
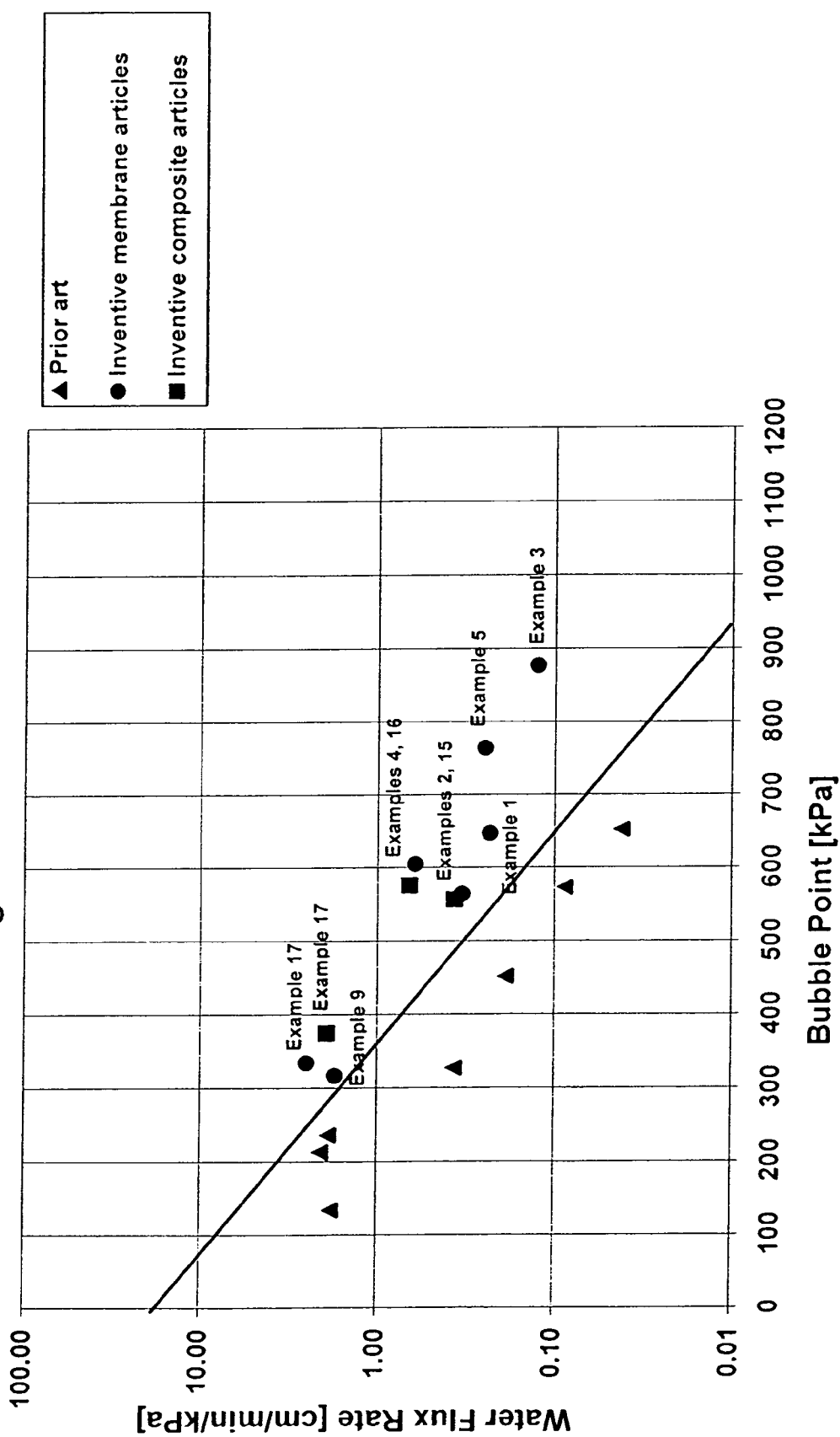
FIG. 2 is a graph depicting water flux rate versus bubble point for porous PTFE membranes and composite membranes made in accordance with examples contained herein.
Figure 3:
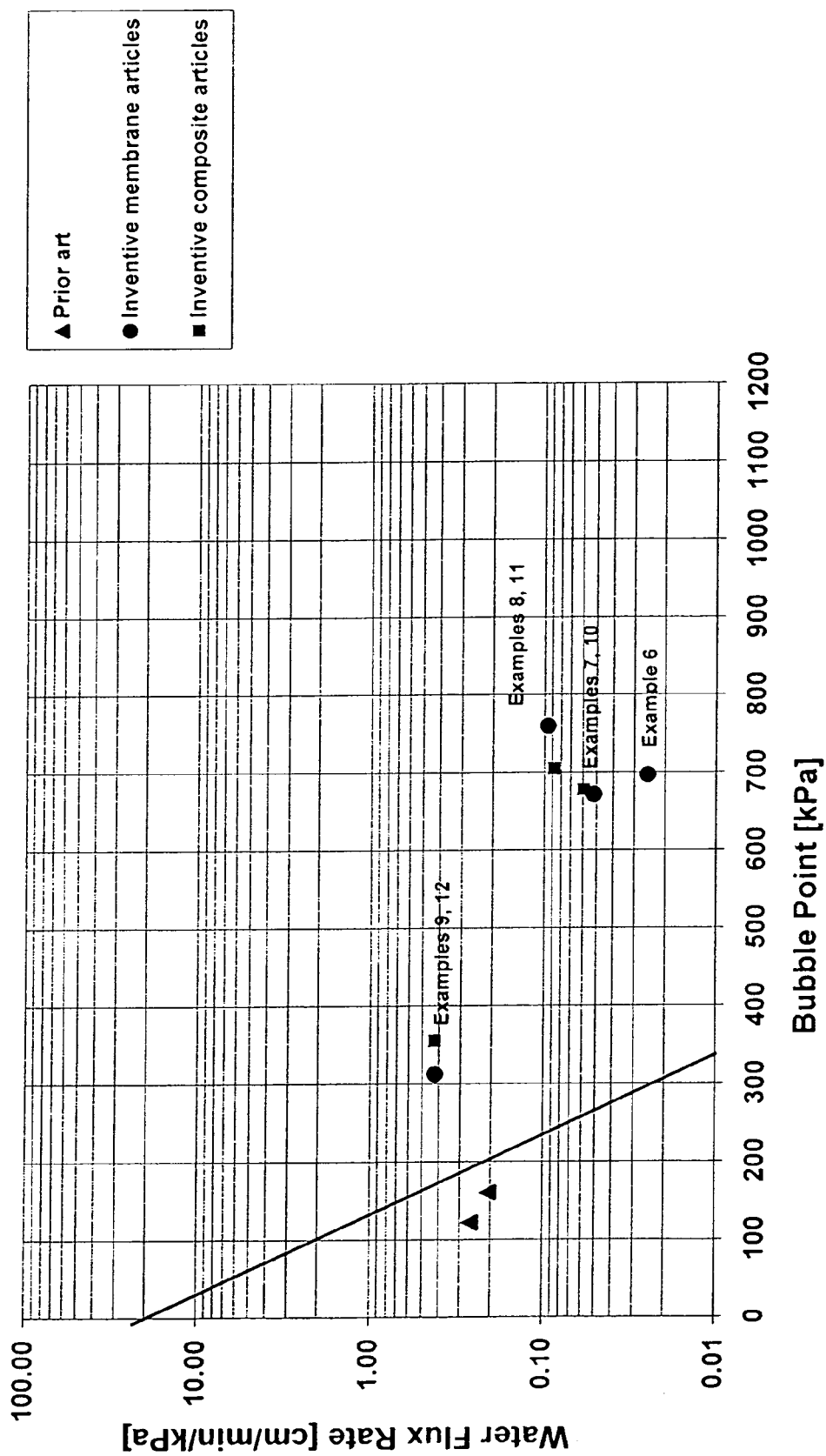
FIG. 3 is a graph depicting water flux rate versus bubble point for hydrophilic porous PTFE membranes and composite membranes made in accordance with examples contained herein.
Figure 4:
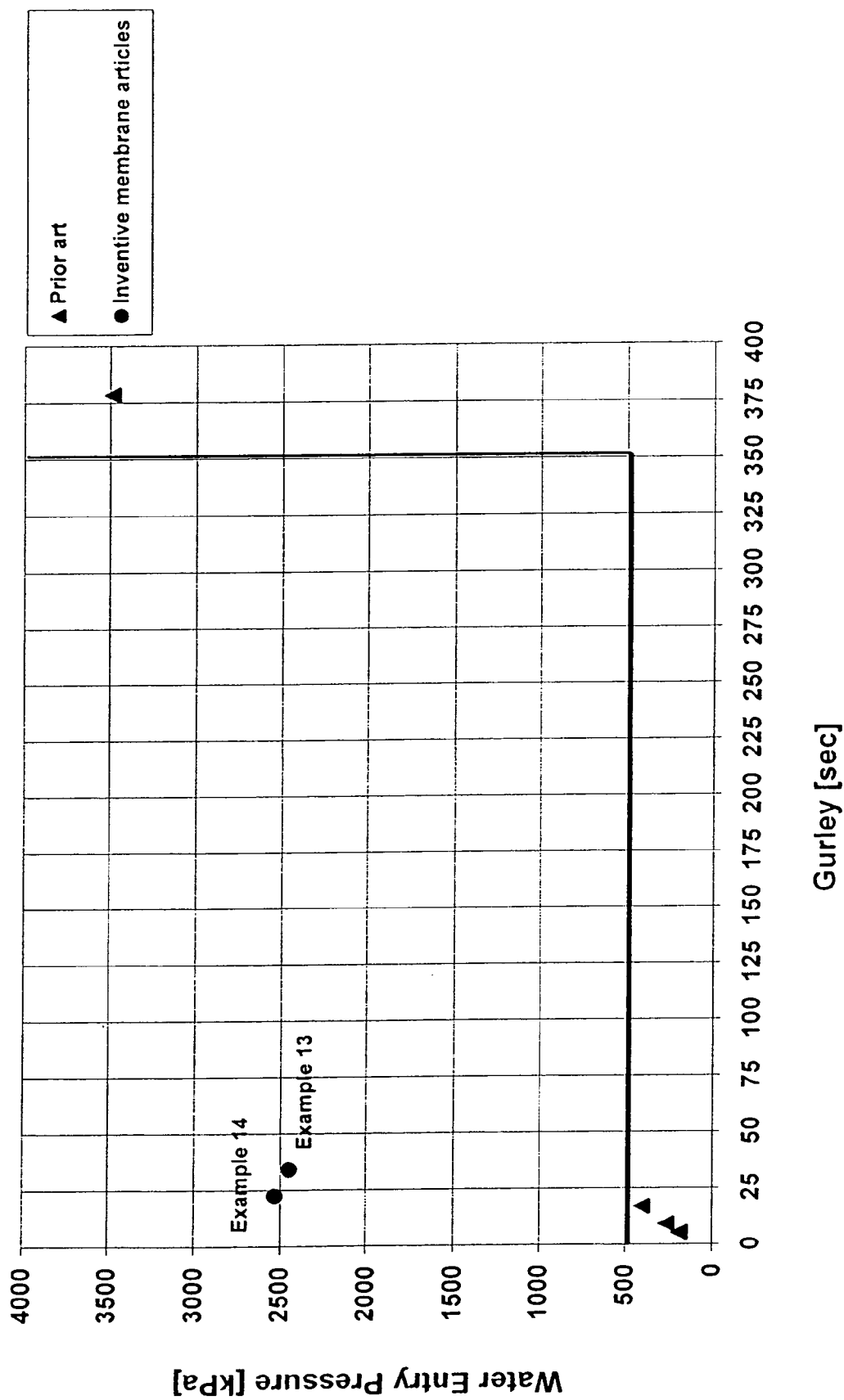
FIG. 4 is a graph depicting water entry pressure versus Gurley number for oleophobic porous PTFE membranes made in accordance with examples contained herein.
Figure 5:
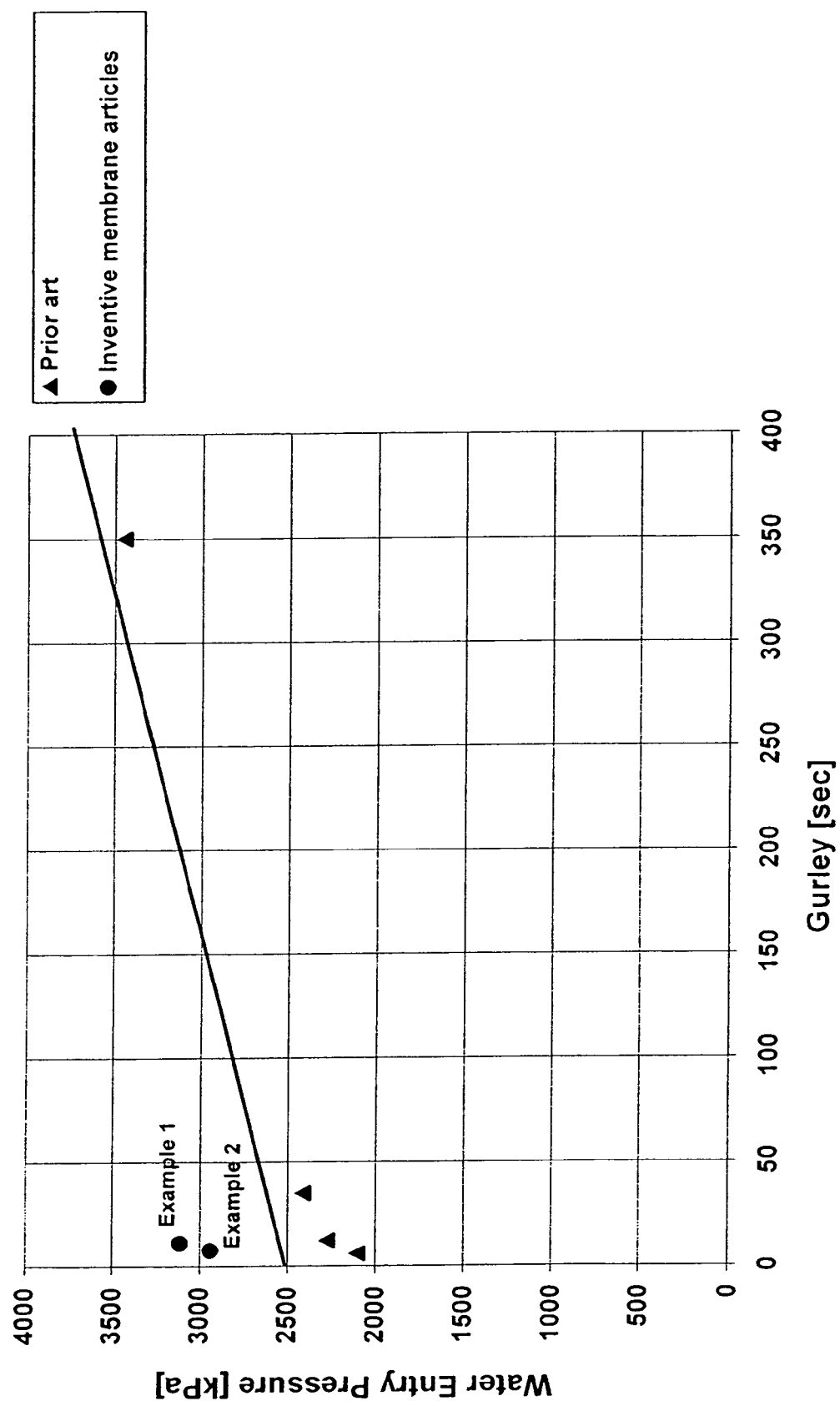
FIG. 5 is a graph depicting water entry pressure versus Gurley number for porous PTFE membranes made in accordance with examples contained herein.
Figure 6:
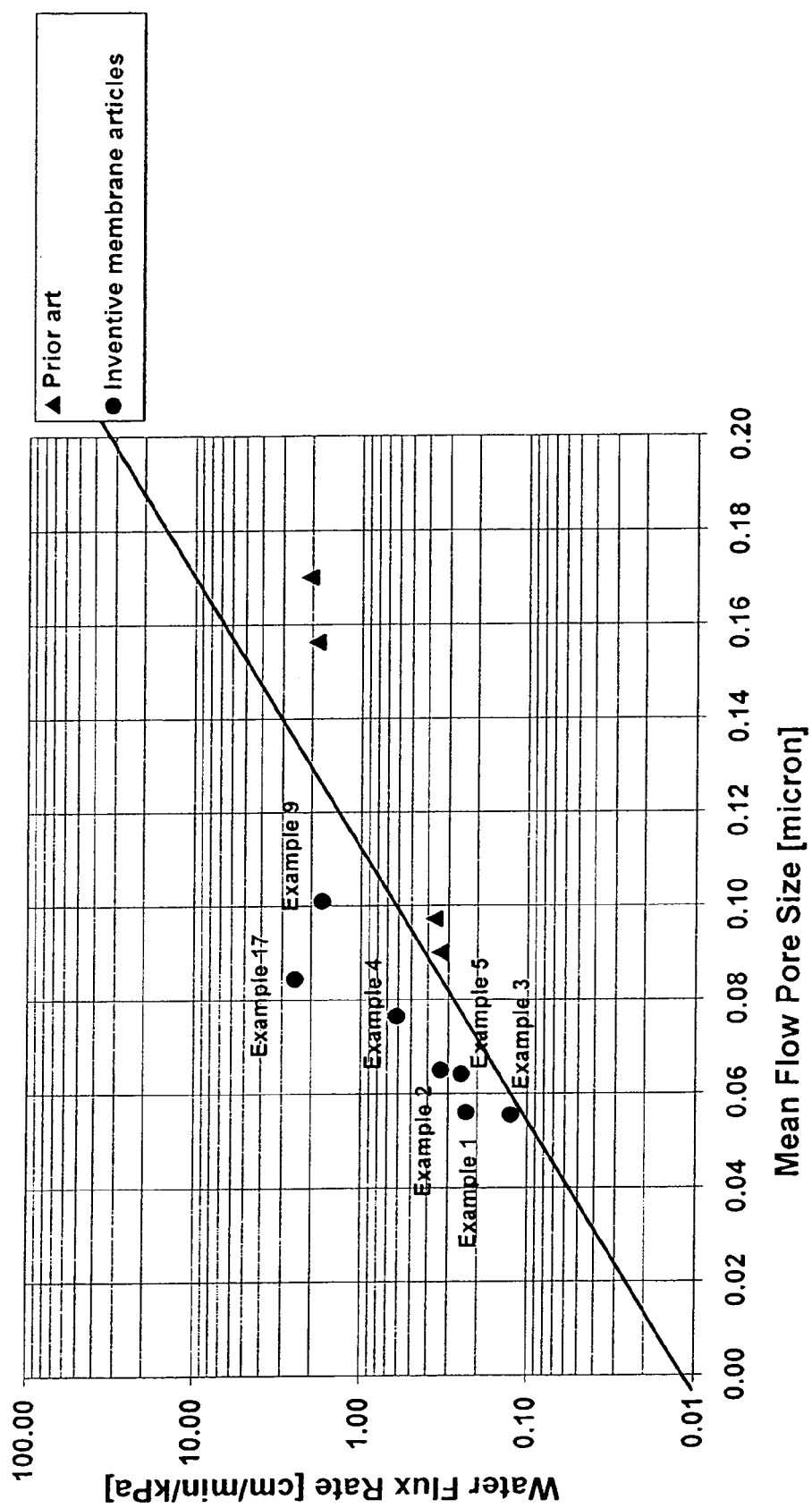
FIG. 6 is a graph depicting water flux rate versus mean flow pore size for porous PTFE membranes made in accordance with examples contained herein.

FIGS. 1 through 6 show the characteristics of inventive articles compared to articles of the prior art. FIG. 1 depicts Gurley number and BP measurements for inventive and prior art membranes. The equation, $\log(\text{Gurley (sec)}) = 2.60 \times 10^{-3} (\text{BP (kPa)}) - 0.54$ describes the line drawn on the graph for a bubble point greater than 448 kPa. The data points for inventive materials fall on or below this line and those for prior art materials fall above this line. FIG. 2 depicts water flux rate and BP measurements for inventive and prior art materials. The equation, $\log(\text{water flux rate (cm/min/kPa)}) = -3.5 \times 10^{-3} (\text{BP (kPa)}) + 1.3$, describes the line drawn on the graph. The data points for inventive materials fall on or above this line and those for prior art materials fall below this line. FIG. 3 depicts water flux rate and BP measurements for inventive and prior art hydrophilic materials. The equation, $\log(\text{water flux rate (cm/min/kPa)}) = -0.01 (\text{BP (kPa)}) + 1.3$, describes the line drawn on the graph. The data points for inventive materials fall on or above this line and those for prior art materials fall below this line. FIG. 4 depicts water entry pressure and Gurley number measurements for inventive and prior art oleophobic materials. The data points corresponding to inventive materials have water entry pressure values of 500 kPa or higher and Gurley numbers of 350 sec or lower. FIG. 5 depicts water entry pressure versus Gurley number for inventive and prior art membranes. The equation, $\text{WEP (kPa)} = 3(\text{Gurley (sec)}) + 2500$, describes the line drawn on the graph. The data points for inventive materials fall on or above this line, those for prior art materials fall below this line. FIG. 6 is a graph depicting water flux rate versus mean flow pore size for inventive and prior art membranes. The equation, $\log(\text{water flux rate (cm/min/kPa)}) = 16.9 (\text{mean flow pore size (microns)}) - 1.85$, describes the line drawn on the graph. The data points for inventive materials fall on or above this line and those for prior art materials fall below this line.

In the equations provided above, Gurley number is expressed in units of seconds, BP in units of kPa, water flux rate in units of cm/min/kPa, water entry pressure in units of kPa, and mean flow pore size in units of microns. The logarithmic equations utilize log to the base 10.

In these six figures, the inventive articles exhibit higher permeability for a given pore size and a smaller pore size for a given permeability as compared to prior art articles.

The superior filtration properties of these novel membranes and composite articles are further enhanced by the high strength of the membranes. Not only are the present membranes strong, they are the strongest, balanced matrix tensile strength ePTFE articles ever produced. The balance of the strength of a membrane is indicated by how closely the ratio of the matrix tensile strengths of the membrane in two orthogonal directions approaches unity. Balanced membranes typically exhibit ratios of about 2 to 1 or less. Further, these membranes possess the largest product of matrix tensile strengths measured in two orthogonal directions. For example, the product of matrix tensile strengths in two orthogonal directions is greater than $1.3 \times 10^5$ MPa$^2$ more preferably greater than $1.5 \times 10^5$ MPa$^2$, and even more preferably greater than $1.9 \times 10^5$ MPa$^2$. Orthogonal directions include, but are not limited to, longitudinal and transverse directions. The high strength is particularly valuable for filtration applications in which the membrane is not used in combination with an additional layer or layers. Higher strength also affords the use of thinner membranes. Thinner membranes present lower flow resistance than otherwise identical thicker membranes. The high strength also facilitates the lamination of the thin membrane to additional layers and also can improve in-use life of filter media in pleated forms. Furthermore, strong membranes better resist rupture in situations in which the filter is subjected to high pressures or pulses of pressure.

Yet another surprising aspect of the invention is the unprecedented high surface area of these novel membranes, as measured herein. Prior art ePTFE membranes are referred to as having surface area per mass values in the range of 10 to 19 m²/g. Some membranes of the present invention can be tailored to have a surface area at least as high as 20 to 27 m²/g.

Non-porous forms of PTFE and ePTFE allow significantly more visible light to pass though them than do porous, lower density forms. The index of refraction of PTFE (typically 1.3 to 1.4 depending on percent crystallinity of the PTFE) causes ePTFE materials to be diffusely reflective. Typically, these materials have light transmission values of less than 50%. Another feature of this invention is that membranes possessing high clarity can also be made which possess remarkably high degrees of porosity. For example, membranes of the present invention can have a light transmission of least 50% and a porosity of at least 50%. Light transmission values of 85% and higher are obtainable in membranes that are greater than 75% porous. Such materials have particular value in applications requiring the combination of transparency, or translucency, and permeability.

The present invention will be further described with respect to the non-limiting examples provided below.

EXAMPLES

Testing Methods Utilized in the Examples

Thickness Measurements

Membrane thickness was measured by placing the membrane between the two plates of a Kafer FZ1000/30 thickness snap gauge (Käfer Messuhrenfabrik GmbH, Villingen-Schwenningen, Germany). The average of the three measurements was used.

Density Measurements

Samples die cut to form rectangular sections 2.54 cm by 15.24 cm were measured to determine their mass (using a Mettler-Toledo analytical balance modelAG204) and their thickness (using a Kafer FZ1000/30 snap gauge). Using these data, density was calculated with the following formula:

$$\rho = \frac{m}{w * l * t}$$

in which: ρ=density (g/cc); m=mass (g); w=width (cm); l=length (cm); and t=thickness (cm). The average of the three measurements was used.

Tensile Break Load Measurements and Matrix Tensile Strength (MTS) Calculations

Tensile break load was measured using an INSTRON 1122 tensile test machine equipped with flat-faced grips and a 0.445 kN load cell. The gauge length was 5.08 cm and the cross-head speed was 50.8 cm/min. The sample dimensions were 2.54 cm by 15.24 cm. For longitudinal MTS measurements, the larger dimension of the sample was oriented in the machine, or "down web," direction. For the transverse MTS measurements, the larger dimension of the sample was oriented perpendicular to the machine direction, also known as the cross web direction. Each sample was weighed using a Mettler Toledo Scale Model AG204, then the thickness of the samples was taken using the Kafer FZ1000/30 thickness snap gauge. The samples were then tested individually on the tensile tester. Three different sections of each sample were measured. The average of the three maximum load (i.e., the peak force) measurements was used. The longitudinal and transverse MTS were calculated using the following equation:

MTS=(maximum load/cross-section area)*(bulk density of PTFE)/density of the porous membrane), wherein the bulk density of PTFE is taken to be 2.2 g/cc.

Ball Burst Strength Measurements

The test method and related sample mounting apparatus were developed by W.L. Gore & Associates, Inc. for use with a Chatillon Test Stand. The test measures the burst strength of materials such as fabrics (woven, knit, nonwoven, etc.), porous or nonporous plastic films, membranes, sheets, etc., laminates thereof, and other materials in planar form.

A specimen was mounted taut, but unstretched, between two annular clamping plates with an opening of 7.62 cm diameter. A metal rod having a polished steel 2.54 cm diameter ball-shaped tip applied a load against the center of the specimen in the Z-direction (normal to the X-Y planar directions). The rod was connected at its other end to an appropriate Chatillon force gauge mounted in a Chatillon Materials Test Stand, Model No. TCD-200. The load was applied at the rate of 25.4 cm/minute until failure of the specimen occurred. The failure (tearing, burst, etc.) may occur anywhere within the clamped area. Results were reported as the average of three measurements of the maximum applied force before failure.

Testing was done at ambient interior temperature and humidity conditions, generally at a temperature of 21 to 24° C. and relative humidity of 35 to 55%. Ball burst data can be expressed as the ball burst strength as a function of mass per area of the sample; mass per area of the sample can be determined from the product of density and thickness of the sample.

Gurley Measurements

The Gurley air flow test measures the time in seconds for 100 cm³ of air to flow through a 6.45 cm² sample at 12.4 cm of water pressure. The samples were measured in a Gurley Densometer Model 4340 Automatic Densometer. Articles possessing Gurley values less than about 2 seconds were submitted for Frazier number testing, since this test provides more reliable values for the characterization of highly permeable articles. The average of the three measurements was used.

Frazier Measurements

The Frazier permeability reading is the rate of flow of air in cubic feet per square foot of sample area per minute at a differential pressure drop across the test sample of 12.7 mm water column. Air permeability was measured by clamping a test sample into a circular gasketed flanged fixture which provided a circular opening of 17.2 cm diameter (232 $cm^2$ area). The upstream side of the sample fixture was connected to a flow meter in line with a source of dry compressed air. The downstream side of the sample fixture was open to the atmosphere. The flow rate through the sample was measured and recorded as the Frazier number. The average of the three measurements was used. Frazier number data can be converted to Gurley numbers by use of the following equation: Gurley=3.126/Frazier, in which Gurley number is expressed in units of seconds.

Water Flux Rate Measurement

The following procedure was used to calculate the water flux rate through the membrane. The membrane was either draped across the tester (Sterifil Holder 47 mm Catalog Number: XX11J4750, Millipore) or cut to size and laid over the test plate. The membrane was first wet out completely with 100% isopropyl alcohol. The tester was filled with de-ionized water (room temperature). A pressure of 33.87 kPa was applied across the membrane; the time for 400 $cm^3$ of de-ionized water to flow through the membrane was measured. The water flux rate was then calculated using the following equation:

water flux rate [cm/min/kPa]=water flow rate [$cm^3$/min]/sample area [$cm^2$]/test pressure [kPa].

It should be noted that for hydrophilic membranes, the membrane was not pre-wet with isopropyl alcohol. The same procedure outlined above was used to measure water flux rate through composite filters. The average of the three measurements was used.

Water Entry Pressure Measurement

Water entry pressure is a test method for measuring water intrusion through a membrane. A Mullen® Tester (Serial No: 8240+92+2949, manufactured by B.F. Perkins, Chicopee, Mass., USA) was used. A test sample was clamped between a pair of testing fixtures made of 1.27 cm thick square plexiglass sheets, 10.16 cm long on each side. The lower fixture had the ability to pressurize a section of the sample with water. A piece of pH paper was placed on top of the sample to serve as an indicator of evidence for water entry. The sample was then pressurized in small increments of pressure until a color change in the pH paper was noticed. The corresponding breakthrough pressure or entry pressure was recorded as the water entry pressure. The average of the three measurements was used.

Bubble Point Measurements

The bubble point and mean flow pore size were measured according to the general teachings of ASTM F31 6-03 using a Capillary Flow Porometer (Model CFP 1500 AEXL from Porous Materials Inc., Ithaca, N.Y.). The sample membrane was placed into the sample chamber and wet with SilWick Silicone Fluid (available from Porous Materials Inc.) having a surface tension of 19.1 dynes/cm. The bottom clamp of the sample chamber had a 2.54 cm diameter, 3.175 mm thick porous metal disc insert (Mott Metallurgical, Farmington, Conn., 40 micron porous metal disk) and the top clamp of the sample chamber had a 3.175 mm diameter hole. Using the Capwin software version 6.62.1 the following parameters were set as specified in the table immediately below. The values presented for bubble point and mean flow pore size were the average of two measurements.

| Parameter | Set Point |
| --- | --- |
| maxflow (cc/m) | 200000 |
| bublflow (cc/m) | 100 |
| F/PT (old bubltime) | 40 |
| minbppres (PSI) | 0 |
| zerotime (sec) | 1 |
| v2incr (cts) | 10 |
| preginc (cts) | 1 |
| pulse delay (sec) | 2 |
| maxpre (PSI) | 500 |
| pulse width (sec) | 0.2 |
| mineqtime (sec) | 30 |
| presslew (cts) | 10 |
| flowslew (cts) | 50 |
| eqiter | 3 |
| aveiter | 20 |
| maxpdif (PSI) | 0.1 |
| maxfdif (cc/m) | 50 |
| sartp (PSI) | 1 |
| sartf (cc/m) | 500 |

Light Transmission Measurements

A radiometer (Model IC 1700, International Light, Newburyport, Mass.) was used to measure the amount of light transmission through the samples of ePTFE membrane. A black tube, approximately the same diameter as the outer diameter of the light receiving sensor, Model SED 033, was clamped onto the light sensor and protruded approximately 13.3 cm from the receiving face of the sensor. The light source, a Sylvania Reflector 50 W, 120V bulb, was mounted directly across from the light sensor approximately 28.6 cm from the receiving face of the light sensor. The radiometer was calibrated by placing a cap over the end of the tube protruding from the light sensor to set the zero point, and removing the cap and turning on the light source with nothing between the light source and the light sensor to set the 100% point. After calibrating the radiometer, the ePTFE membrane was mounted into a 25.4 cm diameter embroidery hoop and held between the light source and the light sensor, approximately 7.6 cm from the light source. The percent transmission of light displayed on the IC 1700 radiometer was recorded. The average of the three measurements was used.

Surface Area Measurements

The surface area per unit mass, expressed in units of $m^2/g$, of the ePTFE membrane was measured using the Brunauer-Emmett-Teller (BET) method on a Coulter SA3100 Gas Adsorption Analyzer (Beckman Coulter Inc., Fullerton, Calif.). A sample was cut from the center of the ePTFE membrane sheet and placed into a small sample tube (reference number 8201151). The mass of the ePTFE sample was approximately 0.1 to 0.2 grams. The tube was placed into the Coulter SA-Prep Surface Area Outgasser, (Model SA-PREP, P/N 5102014) from Beckman Coulter Inc., Fullerton, Calif. and purged at 110 C for 2 hours with helium. The sample tube was then removed from the SA-Prep Outgasser and weighed. The sample tube was then placed into the SA3100 Gas Adsorption Analyzer and the BET surface area analysis was run in accordance with the instrument instructions using helium to calculate the free space and nitrogen as the adsorbate gas. A single measurement was recorded for each sample.

Porosity Calculations

Porosity was expressed in percent porosity and was determined by subtracting the quotient of the average density of the article (described earlier herein) and that of the bulk density of PTFE from 1, then multiplying that value by 100%. For the purposes of this calculation, the bulk density of PTFE was taken to be 2.2 g/cc.

Oil Repellency Measurement/Oil Rating

Oil rating was measured using the AATCC Test Method 118-1997. The oil rating of a membrane is the lower of the two ratings obtained when testing the two sides of the membrane. The higher the number, the better the oil repellency.

Water-Wettability Measurement

Water-wettability was measured in order to characterize the degree of hydrophilicity of a sample. The sample was held taught in a 10.16 cm diameter hoop. A single droplet of water was dropped from a height of 5 cm directly above the sample onto the sample. The time for the droplet to penetrate the pores of the sample was measured. The degree of water-wettability was defined using the following scale:

0=water droplet penetrated the sample within 5 seconds

1=water droplet penetrated the sample after greater than 5 seconds and less than 60 seconds 2=water drop did not penetrate the sample after 60 seconds.

Hydrophobic materials such as porous ePTFE materials possessing relatively small pores typically exhibit water-wettability ratings of 2. Materials exhibiting water-wettability ratings of 0 or 1 were considered to be instantly wettable.

Example 1

Fine powder of PTFE polymer (Daikin Industries, Ltd., Orangeburg, N.Y.) was blended with Isopar K (Exxon Mobil Corp., Fairfax, Va.) in the proportion of 0.196 g/g of fine powder. The lubricated powder was compressed in a cylinder to form a pellet and placed into an oven set at 70° C. for approximately 12 hours. Compressed and heated pellets were ram extruded to produce tapes approximately 15.2 cm wide by 0.73 mm thick. Three separate rolls of tape were produced and layered together between compression rolls to a thickness of 0.76 mm. The tape was then transversely stretched to 56 cm (i.e., at a ratio of 3.7:1), restrained, then dried in an oven set at 270° C. The dry tape was longitudinally expanded between banks of rolls over a heated plate set to a temperature of 340° C. The speed ratio between the second bank of rolls and the first bank of rolls, and hence the expansion ratio, was 8:1. The longitudinally expanded tape was then expanded transversely at a temperature of approximately 320° C. to a ratio of 34:1 and then constrained and heated in an oven set at 320° C. for approximately 24 seconds. The process conditions and intermediate article dimensions for this example appear in Table 1. The process produced a thin strong porous membrane.

TABLE 1

| Process Conditions & Intermediate Article Dimensions | Example 1 | Example 2 | Example 3 | Example 4 | Example 5 |
| --- | --- | --- | --- | --- | --- |
| lubrication level (g/g of resin) | 0.196 | 0.196 | 0.202 | 0.196 | 0.202 |
| pellet conditioning - time (hr) | 12 | 12 | 12 | 12 | 12 |
| pellet conditioning - temperature set point (deg C.) | 70 | 70 | 70 | 70 | 70 |
| tape width (cm) | 15.2 | 15.2 | 15.2 | 15.2 | 15.2 |
| tape thickness (mm) | 0.73 | 0.73 | 0.73 | 0.73 | 0.73 |
| number of tape layers | 3 | 3 | 3 | 1 | 3 |
| calendered tape thickness (mm) | 0.76 | 0.76 | 0.76 | 0.25 | 0.76 |
| transverse stretch ratio | 3.7:1 | 3.7:1 | 3.7:1 | 3.7:1 | 3.7:1 |
| drying temperature set point (deg C.) | 270 | 270 | 250 | 270 | 250 |
| expansion temperature set point (deg C.) | 340 | 340 | 345 | 345 | 345 |
| longitudinal expansion ratio | 8:1 | 13:1 | 15:1 | 15:1 | 20:1 |
| expansion temperature set point (deg C.) | 320 | 320 | 360 | 360 | 360 |
| transverse expansion ratio | 34:1 | 32:1 | 30:1 | 30:1 | 22:1 |
| heat treatment temperature set point (deg C.) | 320 | 320 | 390 | 380 | 390 |
| heat treatment time (sec) | 24 | 24 | 20 | 24 | 20 |

This membrane was then characterized by measuring various properties in the manners described above. Membrane properties for the sample made in this example appear in Table 2. Gurley number and BP data for the sample of this example appear in FIG. 1. Water flux rate and BP data for the sample of this example appear in FIG. 2. Water entry pressure and Gurley number data for the sample of this example appear in FIG. 5. Water flux rate and mean flow pore size data for the sample of this example appear in FIG. 6.

TABLE 2

| Membrane Property | Example 1 | Example 2 | Example 3 | Example 4 | Example 5 |
|---|---|---|---|---|---|
| density (g/cc) | 0.357 | 0.339 | 0.348 | 0.294 | 0.358 |
| thickness (mm) | 0.020 | 0.013 | 0.010 | 0.0025 | 0.0076 |
| longitudinal MTS (MPa) | 217 | 312 | 471 | 414 | 584 |
| transverse MTS (MPa) | 214 | 249 | 289 | 460 | 229 |
| product of longitudinal and transverse MTS (MPa$^2$) | 46,570 | 77,568 | 136,042 | 190,562 | 133,539 |
| ball burst strength (N) | 21.3 | 18.0 | 45.4 | 16.5 | 35.1 |
| Gurley Number (sec) | 11.1 | 7.6 | 12.5 | 2.1 | 7.3 |
| Bubble point (kPa) | 647 | 564 | 877 | 605 | 764 |
| water flux rate (cm/min/kPa) | 0.23 | 0.33 | 0.12 | 0.61 | 0.25 |
| mean flow pore size (micron) | 0.056 | 0.065 | 0.05545 | 0.0765 | 0.0642 |
| water entry pressure (kPa) | 3111 | 2939 | ≧4136 | | |
| surface area (m$^2$/g) | 17.2 | 18.4 | 27.4 | 23.5 | |

Example 2

Fine powder of PTFE polymer (Daikin Industries, Ltd., Orangeburg, N.Y.) was blended with Isopar K (Exxon Mobil Corp., Fairfax, Va.) in the proportion of 0.196 g/g of fine powder. The lubricated powder was compressed in a cylinder to form a pellet and placed into an oven set at 70° C. for approximately 12 hours. The compressed and heated pellets were ram extruded to produce tapes approximately 15.2 cm wide by 0.73 mm thick. Three separate rolls of tape were produced and layered together between compression rolls to a thickness of 0.76 mm. The tape was then transversely stretched to 56 cm (i.e., at a ratio of 3.7:1), restrained, then dried at a temperature of 270° C. The dry tape was longitudinally expanded between banks of rolls in a heat zone set to a temperature of 340° C. The speed ratio between the second bank of rolls to the first bank of rolls, and hence the expansion ratio, was 13:1. The longitudinally expanded tape was then expanded transversely at a temperature of approximately 320° C. to a ratio of 32:1 and then restrained and heated to 320° C. for approximately 24 seconds. The process conditions and intermediate article dimensions for this example appear in Table 1. The process produced a thin strong porous membrane.

This membrane was then characterized by measuring various properties in the manners described above. Membrane properties for the sample made in this example appear in Table 2. Gurley number and BP data for the sample of this example appear in FIG. 1. Water flux rate and BP data for the sample of this example appear in FIG. 2. Water entry pressure and Gurley number data for the sample of this example appear in FIG. 5. Water flux rate and mean flow pore size data for the sample of this example appear in FIG. 6.

Example 3

Fine powder of PTFE polymer as described and taught in U.S. Pat. No. 6,541,589 was blended with Isopar K (Exxon Mobil Corp., Fairfax, Va.) in the proportion of 0.202 g/g of fine powder. The lubricated powder was compressed into a cylinder to form a pellet and placed into an oven set at 70° C. for approximately 12 hours. Compressed and heated pellets were ram extruded to produce tapes approximately 15.2 cm wide by 0.73 mm thick. Three separate rolls of tape were produced and layered together between compression rolls to a thickness of 0.76 mm. The tape was then transversely stretched to 56 cm (i.e., at a ratio of 3.7:1), restrained, then dried at a temperature of 250° C. The dry tape was longitudinally expanded between banks of rolls over a heated plate set to a temperature of 345° C. The speed ratio between the second bank of rolls and the first bank of rolls was 15:1. The longitudinally expanded tape was then expanded transversely at a temperature of approximately 360° C. to a ratio of 30:1 and then restrained and heated in an oven set at 390° C. for approximately 20 seconds. The process produced a thin strong porous membrane. The process conditions and intermediate article dimensions for this example appear in Table 1.

This membrane was then characterized by measuring various properties in the manners described above. Membrane properties for the sample made in this example appear in Table 2. Note that the water entry pressure was at least 4136 kPa because the tester was unable to measure higher than that. Gurley number and BP data for the sample of this example appear in FIG. 1. Water flux rate and BP data for the sample of this example appear in FIG. 2. Water flux rate and mean flow pore size data for the sample of this example appear in FIG. 6.

Example 4

Fine powder of PTFE polymer as described and taught in U.S. Pat. No. 6,541,589 was blended with Isopar K (Exxon Mobil Corp., Fairfax, Va.) in the proportion of 0.196 g/g of fine powder. The lubricated powder was compressed into a cylinder to form a pellet and placed into an oven set at 70° C. for approximately 12 hours. The compressed and heated pellet was ram extruded to produce a tape approximately 15.2 cm wide by 0.73 mm thick. The extruded tape was then rolled down between compression rolls to a thickness of 0.254 mm. The tape was then transversely stretched to 56 cm (i.e., at a ratio of 3.7:1), restrained, then dried at a temperature of 270° C. The dry tape was longitudinally expanded between banks of rolls over a heated plate set to a temperature of 345° C. The speed ratio between the second bank of rolls and the first bank of rolls was 15:1. The longitudinally expanded tape was then expanded transversely at a temperature of approximately 360° C. to a ratio of 30:1 and then restrained and heated in an oven set at 380° C. for approximately 24 seconds. The process produced a thin strong porous membrane. The process conditions and intermediate article dimensions for this example appear in Table 1.

This membrane was then characterized by measuring various properties in the manners described above. Membrane properties for the sample made in this example appear in Table 2. Light transmission was measured to be 90%. Gurley number and BP data for the sample of this example appear in FIG. 1. Water flux rate and BP data for the sample of this example appear in FIG. 2. Water flux rate and mean flow pore size data for the sample of this example appear in FIG. 6.

Example 5

Fine powder of PTFE polymer as described and taught in U.S. Pat. No. 6,541,589 was blended with Isopar K (Exxon Mobil Corp., Fairfax, Va.) in the proportion of 0.202 g/g of fine powder. The lubricated powder was compressed into a cylinder to form a pellet and placed into an oven set at 70° C. for approximately 12 hours. Compressed and heated pellets were ram extruded to produce tapes approximately 15.2 cm wide by 0.73 mm thick. Three separate rolls of tape were produced and layered together between compression rolls to a thickness of 0.76 mm. The tape was then transversely stretched to 56 cm (i.e., at a ratio of 3.7:1), restrained, then dried at a temperature of 250° C. The dry tape was longitudinally expanded between banks of rolls in a heat zone set to a temperature of 345° C. The speed ratio between the second bank of rolls and the first bank of rolls was 20:1. The longitudinally expanded tape was then expanded transversely at a temperature of approximately 360° C. to a ratio of 22:1 and then restrained and heated to 390° C. for approximately 20 seconds. The process produced a thin strong porous membrane. The process conditions and intermediate article dimensions for this example appear in Table 1.

This membrane was then characterized by measuring various properties in the manners described above. Membrane properties for the sample made in this example appear in Table 2. Gurley number and BP data for the sample of this example appear in FIG. 1. Water flux rate and BP data for the sample of this example appear in FIG. 2. Water flux rate and mean flow pore size data for the sample of this example appear in FIG. 6.

Example 6

The membrane of Example 1 was treated to render it hydrophilic according to the following procedure. The membrane sample was held taut in a hoop (10.16 cm diameter). A solution was prepared by dissolving 1% polyvinyl alcohol (Catalog Number 363170, Sigma-Aldrich Co) in a 50/50 mixture of isopropyl alcohol/deionized water. The hoop was immersed in this solution for 1 minute and then rinsed in deionized water for another minute. The hoop was then immersed in a solution containing 2% glutaraldehyde (Catalog Number 340855, Sigma-Aldrich Co), 1% hydrochloric acid (Catalog Number 435570, Sigma-Aldrich Co) in deionized water for 1 minute. The solution temperature was maintained at 50 deg C. This was followed by a deionized water rinse for 1 minute. Finally, the sample was dried in an oven set to 150 deg C. The sample was removed from the oven when it was completely dry. The resulting sample was instantaneously water-wettable, as it exhibited a water-wettability rating of 0. Bubble point and water flux rate values of the hydrophilic membrane made in this example were 697 kPa and 0.03 cm/min/kPa, respectively. Water flux rate and BP data for the sample of this example appear in FIG. 3.

Example 7

The membrane of Example 2 was treated to render it hydrophilic according to the following procedure. The membrane sample was held taut in a hoop (10.16 cm diameter). A solution was prepared by dissolving 1% polyvinyl alcohol (Catalog Number 363170, Sigma-Aldrich Co) in a 50/50 mixture of isopropyl alcohol/deionized water. The hoop was immersed in this solution for 1 minute and then rinsed in deionized water for another minute. The hoop was then immersed in a solution containing 2% glutaraldehyde (Catalog Number 340855, Sigma-Aldrich Co), and 1% hydrochloric acid (Catalog Number 435570, Sigma-Aldrich Co) in deionized water for 1 minute. The solution temperature was maintained at 50 deg C. This was followed by a deionized water rinse for 1 minute. Finally, the sample was dried in an oven set to 150 deg C. The sample was removed from the oven when it was completely dry. The resulting sample was instantaneously water-wettable, as it exhibited a water-wettability rating of 0. Bubble point and water flux rate values of the hydrophilic membrane made in this example were 672 kPa and 0.05 cm/min/kPa, respectively. Water flux rate and BP data for the sample of this example appear in FIG. 3.

Example 8

The membrane of Example 4 was treated to render it hydrophilic according to the following procedure. The membrane sample was held taut in a hoop (10.16 cm diameter). A solution was prepared by dissolving 1% polyvinyl alcohol (Catalog Number 363170, Sigma-Aldrich Co) in a 50/50 mixture of isopropyl alcohol/deionized water. The hoop was immersed in this solution for 1 minute and then rinsed in deionized water for another minute. The hoop was then immersed in a solution containing 2% glutaraldehyde (Catalog Number 340855, Sigma-Aldrich Co), and 1% hydrochloric acid (Catalog Number 435570, Sigma-Aldrich Co) in deionized water for 1 minute. The solution temperature was maintained at 50 deg C. This was followed by a deionized water rinse for 1 minute. Finally, the sample was dried in an oven at 150 deg C. The sample was removed from the oven when it was completely dry. The resulting sample was instantaneously water-wettable, it exhibited a water-wettability rating of 0. Bubble point and water flux rate values of the hydrophilic membrane made in this example were 760 kPa and 0.1 cm/min/kPa, respectively. Water flux rate and BP data for the sample of this example appear in FIG. 3.

Example 9

Fine powder of PTFE polymer (Daikin Industries, Ltd., Orangeburg, N.Y.) was blended with Isopar K (Exxon Mobil Corp., Fairfax, Va.) in the proportion of 0.196 g/g of fine powder. The lubricated powder was compressed in a cylinder to form a pellet and placed into an oven set at 70° C. for approximately 12 hours. Compressed and heated pellets were ram extruded to produce tapes approximately 15.2 cm wide by 0.73 mm thick. Three separate rolls of tape were produced and layered together between compression rolls to a thickness of 0.76 mm. The tape was then transversely stretched to 56 cm (i.e., at a ratio of 3.7:1), restrained, then dried in an oven set at 270° C. The dry tape was longitudinally expanded between banks of rolls over a heated plate set to a temperature of 340° C. The expansion ratio was calculated as the ratio between the speeds of the two banks of rolls and was determined to be 25:1. The longitudinally expanded tape was then expanded transversely at a temperature of approximately 360° C. to a ratio of 20:1 and then restrained and heated in an oven set at 390° C. for approximately 60 seconds. The process produced a thin strong porous membrane.

The membrane had the following properties: a thickness of 0.0051 mm, a density of 0.334 g/cc, longitudinal matrix tensile strength of 546 MPa, transverse matrix tensile strength of 276 MPa, ball burst strength of 22.7 N, Frazier number of 2.8, bubble point of 317 kPa, water flux rate of 1.72 cm/min/kPa, mean flow pore size of 0.101 microns, and a surface area of 24.8 m$^2$/g. Water flux rate and BP data for this membrane appear in FIG. 2. Water flux rate and mean flow pore size data for this membrane appear in FIG. 6.

The membrane was treated to render it hydrophilic according to the following procedure. The membrane sample was held taut in a hoop (10.16 cm diameter). A solution was prepared by dissolving 1% polyvinyl alcohol (Catalog Number 363170, Sigma-Aldrich Co) in a 50/50 mixture of isopropyl alcohol/deionized water. The hoop was immersed in this solution for 1 minute and then rinsed in deionized water for another minute. The hoop was then immersed in a solution containing 2% glutaraldehyde (Catalog Number 340855, Sigma-Aldrich Co), and 1% hydrochloric acid (Catalog Number 435570, Sigma-Aldrich Co) in deionized water for 1 minute. The solution temperature was maintained at 50 deg C. This was followed by a deionized water rinse for 1 minute. Finally, the sample was dried in an oven set to 150 deg C. The sample was removed from the oven when it was dry. The resulting sample was instantaneously water-wettable, as it exhibited a water-wettability rating of 0. Bubble point and water flux rate values of the hydrophilic membrane made in this example were 312 kPa and 0.42 cm/min/kPa, respectively. Water flux rate and BP data for the treated membrane of this example appear in FIG. 3.

Example 10

The hydrophilic membrane of Example 7 was constructed as a composite hydrophilic filter by layering the membrane between two other layers.

These outer layers were ePTFE membranes possessing a Frazier number of 40 which were subsequently hydrophilized. These two layers served as cover layers (i.e., a layer which covers at least a portion of the surface of the membrane); they had very high fluid permeability such that the resultant assembled composite hydrophilic filter possessed essentially the same permeability as the hydrophilic membrane of Example 7. The outer, or cover, layer membranes were rendered hydrophilic using the following procedure. Each cover layer membrane was held taut in a hoop (10.16 cm diameter). A solution was prepared by dissolving 1% polyvinyl alcohol (Catalog Number 363170, Sigma-Aldrich Co) in a 50/50 mixture of isopropyl alcohol/deionized water. The hoop was immersed in this solution for 1 minute and then rinsed in deionized water for another minute. The hoop was then immersed in a solution containing 2% glutaraldehyde (Catalog Number 340855, Sigma-Aldrich Co), and 1% hydrochloric acid (Catalog Number 435570, Sigma-Aldrich Co) in deionized water for 1 minute. The solution temperature was maintained at 50 deg C. This was followed by a deionized water rinse for 1 minute. Finally, each cover layer was dried in an oven set to 150 deg C. The sample was removed from the oven when it was dry.

At this point, the composite hydrophilic filter was assembled by orienting in a layered, but unbonded, configuration the hydrophilic membrane of Example 7 between the two hydrophilic cover membranes. Thus, the composite filter consisted of three layers loosely stacked on top of each other. The edges of the composite were sealed as needed in the test fixtures. Bubble point and water flux rate values of the hydrophilic composite were 678 kPa and 0.06 cm/min/kPa, respectively. The composite was instantaneously water-wettable, as it exhibited a water-wettability rating of 0. Water flux rate and BP data for the sample of this example appear in FIG. 3. Note the proximity of the data point for the composite article relative to the data point for the membrane (of Example 7) used in constructing the composite. The similar properties of the membrane and the composite attest to how well the properties of the membrane can be preserved in the final composite article.

Example 11

The hydrophilic membrane of Example 8 was constructed as a composite hydrophilic filter by layering the membrane between two other layers. These two outer, or cover, layers were created in the same manner as described in Example 10.

The composite hydrophilic filter was assembled by orienting in a layered, but unbonded, configuration the hydrophilic membrane of Example 8 between the two hydrophilic cover membranes. Thus, the composite filter consisted of three layers loosely stacked on top of each other. The edges of the composite were sealed as needed in the test fixtures. Bubble point and water flux rate values of the hydrophilic composite made in this example were 705 kPa and 0.09 cm/min/kPa, respectively. The composite was instantaneously water-wettable, as it exhibited a water-wettability rating of 0. Water flux rate and BP data for the sample of this example appear in FIG. 3. Note the proximity of the data point for the composite article relative to the data point for the membrane (of Example 8) used in constructing the composite. The similar properties of the membrane and the composite attest to how well the properties of the membrane can be preserved in the final composite article.

Example 12

The hydrophilic membrane of Example 9 was used to construct a composite hydrophilic filter by layering the membrane between two other layers. These two outer, or cover, layers were created in the same manner as described in Example 10.

At this point, the composite hydrophilic filter was assembled by orienting in a layered, but unbonded, configuration the hydrophilic membrane of Example 9 between the two hydrophilic cover membranes. During testing, the edges of the composite were clamped, as appropriate, to perform the test. Thus, the composite filter consisted of three layers loosely stacked on top of each other. The edges of the composite were sealed as needed in the test fixtures. The composite was instantaneously water-wettable, as it exhibited a water-wettability rating of 0. Water flux rate and BP data for the sample of this example appear in FIG. 3. Note the proximity of the data point for the composite article relative to the data point for the membrane (of Example 9) used in constructing the composite. The similar properties of the membrane and the composite attest to how well the properties of the membrane can be preserved in the final composite article.

Example 13

The membrane of Example 1 was treated to render it oleophobic according to the teachings of Example 1 of U.S. Pat. No. 5,116,650. The resulting membrane had an oil rating of 3. Water entry pressure and Gurley values for the oleophobic membrane made in this example were 2447 kPa and 34 sec, respectively. Water entry pressure and Gurley number data for the sample of this example appear in FIG. 4.

Example 14

The membrane of Example 2 was treated to render it oleophobic according to the teachings of Example 1 of U.S. Pat. No. 5,116,650. This membrane had an oil rating of 3. Water entry pressure and Gurley values for the oleophobic membrane made in this example were 2530 kPa and 22 sec, respectively. Water entry pressure and Gurley number data for the sample of this example appear in FIG. 4.

Example 15

The membrane of Example 2 was used to construct a composite filter by layering the membrane between two other layers. These two outer, or cover, layers were ePTFE membranes possessing a Frazier number of 40. These two layers served as cover layers; they had very high fluid permeability such that the resultant composite filter possessed essentially the same permeability as the membrane of Example 2.

The composite filter was assembled by orienting in a layered, but unbonded, configuration the membrane of Example 2 between the two cover membranes. Thus, the composite filter consisted of three layers loosely stacked on top of each other. The edges of the composite were sealed as needed in the test fixtures. Bubble point and water flux rate values for the composite filter were 556 kPa and 0.37 cm/min/kPa, respectively. Water flux rate and BP data for the sample of this example appear in FIG. 2. Note the proximity of the data point for the composite article relative to the data point for the membrane (of Example 2) used in constructing the composite. The similar properties of the membrane and the composite attest to how well the properties of the membrane can be preserved in the final composite article.

Example 16

The membrane of Example 4 was used to construct a composite filter by layering the membrane between two other layers. These outer layers were ePTFE membranes possessing a Frazier number of 40. These two layers served as cover layers; they had very high fluid permeability such that the resultant composite filter possessed essentially the same permeability as the membrane of Example 4.

The composite filter was assembled by orienting in a layered, but unbonded, configuration the membrane of Example 4 between the two cover membranes. Thus, the composite filter consisted of three layers loosely stacked on top of each other. The edges of the composite were sealed as needed in the test fixtures. Bubble point and water flux rate values for the composite filter were 575 kPa and 0.66 cm/min/kPa, respectively. Water flux rate and BP data for the sample of this example appear in FIG. 2. Note the proximity of the data point for the composite article relative to the data point for the membrane (of Example 4) used in constructing the composite. The similar properties of the membrane and the composite attest to how well the properties of the membrane can be preserved in the final composite article.

Example 17

Fine powder of PTFE polymer as described and taught in U.S. Pat. No. 6,541,589 was blended with Isopar K (Exxon Mobil Corp., Fairfax, Va.) in the proportion of 0.196 g/g of fine powder. The lubricated powder was compressed into a cylinder to form a pellet and placed into an oven set at 70° C. for approximately 12 hours. The compressed and heated pellet was ram extruded to produce a tape approximately 15.2 cm wide by 0.73 mm thick. The extruded tape was then rolled down between compression rolls to a thickness of 0.19 mm. The tape was then transversely stretched to 56 cm (i.e., at a ratio of 3.7:1) then dried at a temperature of 250° C. The dry tape was longitudinally expanded between banks of rolls over a heated plate set to a temperature of 340° C. The speed ratio between the second bank of rolls and the first bank of rolls was 20:1. The longitudinally expanded tape was then expanded transversely at a temperature of approximately 360° C. to a ratio of 20:1 and then restrained and heated in an oven set at 400° C. for approximately 180 seconds.

The process produced a thin strong porous membrane. The membrane had the following properties: a thickness of 0.0025 mm, a density of 0.180 g/cc, longitudinal matrix tensile strength of 609 MPa, transverse matrix tensile strength of 220 MPa, ball burst strength of 3.6 N, Frazier number of 6.1, bubble point of 337 kPa, water flux rate of 2.49 cm/min/kPa, mean flow pore size of 0.085 microns, and a light transmission of 92%. Water flux rate and mean flow pore size data for this membrane appear in FIG. 6.

This membrane was used to construct a composite filter by layering the membrane between two other layers. These outer layers were ePTFE membranes possessing a Frazier number of 40. These two layers served as cover layers; they had very high fluid permeability such that the resultant composite filter possessed essentially the same permeability as the membrane made earlier in this example.

The composite filter was assembled by orienting in a layered, but unbonded, configuration this membrane between the two cover membranes. Thus, the composite filter consisted of three layers were loosely stacked on top of each other. The edges of the composite were sealed as needed in the test fixtures. Bubble point and water flux rate values for the composite filter were 374 kPa and 1.92 cm/min/kPa, respectively. Water flux rate and BP data for the membrane and the composite article of this example appear in FIG. 2. Note the proximity of the data point for the composite article relative to the data point for the membrane used in constructing the composite. The similar properties of the membrane and the composite attest to how well the properties of the membrane made in this example can be preserved in the final composite article.

While the invention has been disclosed herein in connection with certain embodiments and detailed descriptions, it will be clear to one skilled in the art that modifications or variations of such detail can be made without deviating from the spirit of the invention, and such modifications or variations are considered to be within the scope of the claims herein.

We claim:

1. An article comprising
a porous PTFE membrane formed by a method comprising
forming an extruded lubricated tape of PTFE polymer by a paste extrusion process;
stretching the extruded lubricated tape transversely, and drying the stretched tape to remove lubricant;
longitudinally expanding the resulting tape;
then transversely expanding the tape at an expansion ratio of 20:1 or greater,
said porous PTFE membrane having a Gurley versus bubble point equal to or below the line defined by the equation log (Gurley)=$5.13 \times 10^{-3}$ (Bubble Point)−1.26 and a surface area of at least 20 m²/g.

2. The article of claim 1, wherein said extruded lubricated tape is stretched transversely at a ratio of at least 3:1.

3. The article of claim 1, wherein the ratio of matrix tensile strength in two orthogonal directions is 2:1 or less.

4. The article of claim 1, wherein the product of matrix tensile strength in two orthogonal directions is greater than $1.3 \times 10^5$ MPa².

5. The article of claim 1, wherein the product of matrix tensile strength in two orthogonal directions is greater than $1.5 \times 10^6$ MPa².

6. The article of claim 1, wherein the product of matrix tensile strength in two orthogonal directions is greater than $1.9 \times 10^5$ MPa².

7. The article of claim 1, wherein said PTFE membrane has a light transmission of greater than 50%.

8. The article of claim 1, wherein the Gurley versus bubble point is equal to or below the line defined by the equation log (Gurley)=$5.13 \times 10^{-3}$ (Bubble Point)−1.58.

9. The article of claim 1, wherein the Gurley versus bubble point is equal to or below the line defined by the equation log (Gurley)=$5.13 \times 10^{-3}$ (Bubble Point)−2.02.

10. An article comprising a porous PTFE membrane formed by a method comprising
forming an extruded lubricated tape of PTFE polymer by a paste extrusion process;
stretching the extruded lubricated tape transversely, and drying the stretched tape to remove lubricant;
longitudinally expanding the resulting tape;
then transversely expanding the tape at an expansion ratio of 20:1 or greater,
said porous PTFE membrane having a light transmission of at least 50% and a porosity of at least 50%.

11. The article of claim 10, wherein said extruded lubricated tape is stretched transversely at a ratio of at least 3:1.

12. The article of claim 10, wherein said porous PTFE membrane has a light transmission of at least 85% and a porosity of at least 75%.

13. An article comprising a porous PTFE membrane formed by a method comprising
forming an extruded lubricated tape of PTFE polymer by a paste extrusion process;
stretching the extruded lubricated tape transversely, and drying the stretched tape to remove lubricant;
longitudinally expanding the resulting tape;
then transversely expanding the tape at an expansion ratio of 20:1 or greater,
said porous PTFE membrane having a bubble point of at least 448 kPa and a Gurley versus bubble point equal to or below the line defined by the equation log (Gurley) =$2.60 \times 10^{-3}$ (Bubble Point)−0.54.

14. The article of claim 13, wherein said extruded lubricated tape is stretched transversely at a ratio of at least 3:1.

15. The article of claim 13, wherein the Gurley versus bubble point is equal to or below the line defined by the equation log (Gurley)=$2.60 \times 10^{-3}$ (Bubble Point)−0.59.

16. The article of claim 13, wherein the Gurley versus bubble point is equal to or below the line defined by the equation log (Gurley)=$2.60 \times 10^{-3}$ (Bubble Point)−1.12.

17. A porous PTFE membrane formed by a method comprising
forming an extruded lubricated tape of PTFE polymer by a paste extrusion process;
stretching the extruded lubricated tape transversely, and drying the stretched tape to remove lubricant;
longitudinally expanding the resulting tape;
then transversely expanding the tape at an expansion ratio of 20:1 or greater,
said porous PTFE membrane having a product of matrix tensile strengths in two orthogonal directions of at least $1.3 \times 10^5$ MPa².

18. The article of claim 17, wherein said extruded lubricated tape is stretched transversely at a ratio of at least 3:1.

19. The article of claim 17, wherein the product of matrix tensile strength in two orthogonal directions is greater than $1.5 \times 10^5$ MPa$^2$.

20. The article of claim 17, wherein the product of matrix tensile strength in two orthogonal directions is greater than $1.9 \times 10^5$ MPa$^2$.

21. An article comprising a porous PTFE membrane formed by a method comprising
forming an extruded lubricated tape of PTFE polymer by a paste extrusion process;
stretching the extruded lubricated tape transversely, and drying the stretched tape to remove lubricant;
longitudinally expanding the resulting tape;
then transversely expanding the tape at an expansion ratio of 20:1 or greater,
said porous PTFE membrane having a Gurley versus bubble point equal to or below the line defined by the equation log (Gurley)=$5.13 \times 10^{-3}$ (Bubble Point)−1.26 and a product of matrix tensile strengths in two orthogonal directions of at least $1.3 \times 10^5$ MPa$^2$.

22. The article of claim 21, wherein said extruded lubricated tape is stretched transversely at a ratio of at least 3:1.

23. The article of claim 21, wherein the product of matrix tensile strength in two orthogonal directions is greater than $1.5 \times 10^5$.

24. The article of claim 21, wherein the product of matrix tensile strength in two orthogonal directions is greater than $1.9 \times 10^5$.

25. The article of claim 21, wherein the Gurley versus bubble point is equal to or below the line defined by the equation log (Gurley)=$5.13 \times 10^{-3}$ (Bubble Point)−1.58.

26. The article of claim 21, wherein the Gurley versus bubble point is equal to or below the line defined by the equation log (Gurley)=$5.13 \times 10^{-3}$ (Bubble Point)−2.02.

27. An article comprising a porous PTFE membrane formed by a method comprising
forming an extruded lubricated tape of PTFE polymer by a paste extrusion process;
stretching the extruded lubricated tape transversely, and drying the stretched tape to remove lubricant;
longitudinally expanding the resulting tape;
then transversely expanding the tape at an expansion ratio of 20:1 or greater,
said porous PTFE membrane having a water entry pressure versus Gurley number equal to or above the line defined by the equation WEP=3(Gurley)+2500.

28. The article of claim 27, wherein said extruded lubricated tape is stretched transversely at a ratio of at least 3:1.

29. The article of claim 27, wherein the water entry pressure versus Gurley is equal to or above the line defined by the equation WEP=3(Gurley)+2900.

30. The article of claim 27, wherein the water entry pressure versus Gurley is equal to or above the line defined by the equation WEP=3(Gurley)+3100.

31. The article of claim 27, wherein the Gurley versus bubble point is equal to or below the line defined by the equation log (Gurley)=$5.13 \times 10^{-3}$ (Bubble Point)−1.26.

32. The article of claim 27, wherein the Gurley number is between 1 and 50 seconds.

33. The article of claim 27, wherein the Gurley number is between 5 and 50 seconds.

34. An article comprising a porous PTFE membrane formed by a method comprising
forming an extruded lubricated tape of PTFE polymer by a paste extrusion process;
stretching the extruded lubricated tape transversely, and drying the stretched tape to remove lubricant;
longitudinally expanding the resulting tape;
then transversely expanding the tape at an expansion ratio of 20:1 or greater,
said porous PTFE membrane having a water flux rate versus bubble point equal to or above the line defined by the equation log (Water Flux Rate)=$-3.5 \times 10^{-3}$ (Bubble Point)+1.3.

35. The article of claim 34, wherein extruded PTFE extruded lubricated tape is stretched transversely at a ratio of at least 3:1.

36. The article of claim 34, having a water flux rate versus bubble point equal to or above the line defined by the equation log (Water Flux Rate)=$-3.5 \times 10^{-3}$ (Bubble Point)+1.6.

37. The article of claim 34, having a water flux rate versus bubble point equal to or above the line defined by the equation log (Water Flux Rate)=$-3.5 \times 10^{-3}$ (Bubble Point)+2.0.

38. An article comprising a porous PTFE membrane formed by a method comprising
forming an extruded lubricated tape of PTFE polymer by a paste extrusion process;
stretching the extruded lubricated tape transversely, and drying the stretched tape to remove lubricant;
longitudinally expanding the resulting tape;
then transversely expanding the tape at an expansion ratio of 20:1 or greater,
said porous PTFE membrane having a water flux rate versus mean flow pore size equal to or above the line defined by the equation log (water flux rate)=16.9 (mean flow pore size)−1.85.

39. The article of claim 38, wherein extruded lubricated tape is stretched transversely at a ratio of at least 3:1.

40. The article of claim 38, having a water flux rate versus mean flow pore size equal to or above the line defined by the equation log (Water Flux Rate)=16.9 (mean flow pore size)−1.6.

41. The article of claim 38, having a water flux rate versus mean flow pore size equal to or above the line defined by the equation log (Water Flux Rate)=16.9 (mean flow pore size)−1.05.

42. An article comprising a composite of at least one porous PTFE membrane and at least one additional layer, said porous PTFE membrane formed by a method comprising
forming an extruded lubricated tape of PTFE polymer by a paste extrusion process;
stretching the extruded lubricated tape transversely, and drying the stretched tape to remove lubricant;
longitudinally expanding the resulting tape;
then transversely expanding the tape at an expansion ratio of 20:1 or greater,
said composite having a water flux rate versus bubble point equal to or above the line defined by the equation log (Water Flux Rate)=$-3.5 \times 10^{-3}$ (Bubble Point)+1.3.

43. The article of claim 42, wherein said extruded lubricated tape is stretched transversely at a ratio of at least 3:1.

44. The article of claim 42, having a water flux rate versus bubble point equal to or above the line defined by the equation log (Water Flux Rate)=$-3.5 \times 10^{-3}$ (Bubble Point)+1.6.

45. The article of claim 42, having a water flux rate versus bubble point equal to or above the line defined by the equation log (Water Flux Rate)=$-3.5 \times 10^{-3}$ (Bubble Point)+2.0.

46. The article of claim 42, wherein said at least 1 additional layer is selected from the group consisting of non-woven, scrim and fabric.

47. The article of claim 42, wherein said at least one additional layer comprises at least one additional layer on each side of the at least one membrane.

48. The article of claim 42, wherein said at least 1 additional layer comprises at least one porous membrane.

49. The article of claim 48, wherein said at least one porous membrane comprises ePTFE.

50. The article of claim 47, wherein said at least one additional layer on each side comprises ePTFE.

51. The article of claim 42 in the form of a filter.

52. The article of claim 42 in the form of a vent.

53. The article of claim 51 in the form of a filter cartridge.

54. An article comprising a composite of at least one porous PTFE membrane and at least one additional layer, said porous PTFE membrane formed by a method comprising
forming an extruded lubricated tape of PTFE polymer by a paste extrusion process;
stretching the extruded lubricated tape transversely, and drying the stretched tape to remove lubricant;
longitudinally expanding the resulting tape;
then transversely expanding the tape at an expansion ratio of 20:1 or greater,
said composite further being instantly wettable with water, said composite having a water flux rate versus bubble point equal to or greater than the line defined by the equation log (Water Flux Rate)=−0.01 (Bubble Point)+1.3.

55. The article of claim 54, wherein said extruded lubricated tape is stretched transversely at a ratio of at least 3:1.

56. The article of claim 54, having a water flux rate versus bubble point equal to or greater than the line defined by the equation log (Water Flux Rate)=−0.01 (Bubble Point)+2.48.

57. The article of claim 54, having a water flux rate versus bubble point equal to or greater than the line defined by the equation log (Water Flux Rate)=−0.01 (Bubble Point)+5.0.

58. The article of claim 54, wherein said at least 1 additional layer is selected from the group consisting of non-woven, scrim and fabric.

59. The article of claim 54, wherein said at least one additional layer comprises at least one additional layer on each side of the at least one membrane.

60. The article of claim 54, wherein said at least 1 additional layer comprises at least one porous membrane.

61. The article of claim 60, wherein said at least one porous membrane comprises ePTFE.

62. The article of claim 59, wherein said at least one additional layer on each side comprises ePTFE.

63. The article of claim 54 in the form of a filter.

64. The article of claim 54 in the form of a vent.

65. The article of claim 63 in the form of a filter cartridge.

66. An article comprising a porous PTFE membrane formed by a method comprising
forming an extruded lubricated tape of PTFE polymer by a paste extrusion process;
stretching the extruded lubricated tape transversely, and drying the stretched tape to remove lubricant;
longitudinally expanding the resulting tape;
then transversely expanding the tape at an expansion ratio of 20:1 or greater,
said porous PTFE membrane being instantly wettable with water, said membrane having a water flux rate versus bubble point equal to or above the line defined by the equation log (Water Flux Rate)=−0.01 (Bubble Point)+1.3.

67. The article of claim 66, wherein said extruded lubricated tape is stretched transversely at a ratio of at least 3:1.

68. The article of claim 66, having a water flux rate versus bubble point equal to or below the line defined by the equation log (Water Flux Rate)=−0.01 (Bubble Point)+2.48.

69. The article of claim 66, having a water flux rate versus bubble point equal to or below the line defined by the equation log (Water Flux Rate)=−0.01 (Bubble Point)+5.0.

70. An article comprising at least one porous PTFE membrane formed by a method comprising
forming an extruded lubricated tape of PTFE polymer by a paste extrusion process;
stretching the extruded lubricated tape transversely, and drying the stretched tape to remove lubricant;
longitudinally expanding the resulting tape;
then transversely expanding the tape at an expansion ratio of 20:1 or greater,
said porous PTFE membrane having an oleophobic treatment thereon and an oil rating of at least 2, said article having a water entry pressure above 1250 kPa and a Gurley number of greater than 0 and less than 200 seconds.

71. The article of claim 70, wherein said article has an oil rating of at least 3.

72. The article of claim 70, wherein said article has an oil rating of at least 5.

73. The article of claim 70, wherein said article has a water entry pressure above 2000 kPa and a Gurley number of greater than 0 and less than 100 seconds.

74. The article of claim 70, wherein extruded lubricated tape is stretched transversely at a ratio of at least 3:1.

75. An article comprising a porous PTFE membrane formed by a method comprising
forming an extruded lubricated tape of PTFE polymer by a paste extrusion process;
stretching the extruded lubricated tape transversely, and drying the stretched tape to remove lubricant;
longitudinally expanding the resulting tape;
then transversely expanding the tape at an expansion ratio of 20:1 or greater,
said porous PTFE membrane having a Gurley versus bubble point equal to or below the line defined by the equation log (Gurley)=5.13×10$^{-3}$ (Bubble Point)−1.22 and a light transmission of at least 50%.

76. The article of claim 75, wherein extruded lubricated tape is stretched transversely at a ratio of at least 3:1.

77. The article of claim 75, wherein the Gurley versus bubble point is equal to or below the line defined by the equation log (Gurley)=5.13×10$^{-3}$ (Bubble Point)−1.58.

78. The article of claim 75, wherein the Gurley versus bubble point is equal to or below the line defined by the equation log (Gurley)=5.13×10$^{-3}$ (Bubble Point)−2.02.

79. A method of filtering a fluid comprising:
providing a filter comprising a porous PTFE membrane formed by a method comprising
forming an extruded lubricated tape of PTFE polymer by a paste extrusion process;
stretching the extruded lubricated tape transversely, and drying the stretched tape to remove lubricant;
longitudinally expanding the resulting tape;
then transversely expanding the tape at an expansion ratio of 20:1 or greater, said porous PTFE membrane having a water flux rate versus bubble point equal to or above the line defined by the equation log (Water Flux Rate)=−3.5×10$^{-3}$ (Bubble Point)+1.3; and flowing a fluid containing particle through said filter;

thereby filtering said particles from said fluid.

80. A method of filtering a fluid comprising:

providing a filter comprising a porous PTFE membrane formed by a method comprising forming an extruded lubricated tape of PTFE polymer by a paste extrusion process;

stretching the extruded lubricated tape transversely, and drying the stretched tape to remove lubricant;

longitudinally expanding the resulting tape;

then transversely expanding the tape at an expansion ratio of 20:1 or greater, said porous PTFE membrane having a water flux rate versus mean flow pore size equal to or above the line defined by the equation log (water flux rate)=16.9 (mean flow pore size)−1.85; and flowing a fluid containing contaminants through said filter;

thereby filtering said particles from said fluid.

81. A method of filtering a fluid comprising:

providing a filter comprising a composite of at least one porous PTFE membrane and at least one additional layer, said porous PTFE membrane formed by a method comprising forming an extruded lubricated tape of PTFE polymer by a paste extrusion process;

stretching the extruded lubricated tape transversely, and drying the stretched tape to remove lubricant;

longitudinally expanding the resulting tape;

then transversely expanding the tape at an expansion ratio of 20:1 or greater, said composite having a water flux rate versus bubble point equal to or above the line defined by the equation log (Water Flux Rate)=−3.5×10$^{-3}$ (Bubble Point)+1.3; and flowing a fluid containing particle through said filter;

thereby filtering said particles from said fluid.

82. A method of filtering a fluid comprising:

providing a filter comprising a porous PTFE membrane formed by a method comprising forming an extruded lubricated tape of PTFE polymer by a paste extrusion process;

stretching the extruded lubricated tape transversely, and drying the stretched tape to remove lubricant;

longitudinally expanding the resulting tape;

then transversely expanding the tape at an expansion ratio of 20:1 or greater, said porous PTFE membrane instantly wettable with water, said membrane having a water flux rate versus bubble point equal to or above the line defined by the equation log (Water Flux Rate)=−0.01 (Bubble Point)+1.3; and flowing a fluid containing particle through said filter;

thereby filtering said particles from said fluid.

83. The method of claim 81, wherein said filter comprises a hydrophilic composite.

84. An article comprising a porous PTFE membrane formed by a method comprising:

forming an extruded lubricated tape of PTFE polymer by a paste forming process;

stretching the extruded lubricated tape transversely at a ratio of at least 3:1, and drying the stretched tape to remove lubricant;

longitudinally expanding the resulting tape at a temperature above 327° C.;

then transversely expanding the tape at a temperature above 327° C., said porous PTFE membrane having a Gurley versus bubble point equal to or below the line defined by the equation log (Gurley)=5.13×10$^{-3}$ (Bubble Point)−1.26 and a surface area of at least 20 m$^2$/g.

85. An article comprising a porous PTFE membrane formed by a method comprising forming an extruded lubricated tape of PTFE polymer by a paste forming process;

stretching the extruded lubricated tape transversely at a ratio of at least 3:1, and drying the stretched tape to remove lubricant;

longitudinally expanding the resulting tape at a temperature above 327° C.;

then transversely expanding the tape at a temperature above 327° C., said porous PTFE membrane having a light transmission of at least 50% and a porosity of at least 50%.

86. An article comprising a porous PTFE membrane formed by a method comprising forming an extruded lubricated tape of PTFE polymer by a paste forming process;

stretching the extruded lubricated tape transversely at a ratio of at least 3:1, and drying the stretched tape to remove lubricant;

longitudinally expanding the resulting tape at a temperature above 327° C.;

then transversely expanding the tape at a temperature above 327° C., said porous PTFE membrane having a bubble point of at least 448 kPa and a Gurley versus bubble point equal to or below the line defined by the equation log (Gurley) =2.60×10$^{-3}$ (Bubble Point)−0.54.

87. A porous PTFE membrane formed by a method comprising forming an extruded lubricated tape of PTFE polymer by a paste forming process;

stretching the extruded lubricated tape transversely at a ratio of at least 3:1, and drying the stretched tape to remove lubricant;

longitudinally expanding the resulting tape at a temperature above 327° C.;

then transversely expanding the tape at a temperature above 327° C., said porous PTFE membrane having a product of matrix tensile strengths in two orthogonal directions of at least 1.3×10$^5$ MPa$^2$.

88. An article comprising a porous PTFE membrane formed by a method comprising forming an extruded lubricated tape of PTFE polymer by a paste forming process;

stretching the extruded lubricated tape transversely at a ratio of at least 3:1, and drying the stretched tape to remove lubricant;

longitudinally expanding the resulting tape at a temperature above 327° C.;

then transversely expanding the tape at a temperature above 327° C., said porous PTFE membrane having a Gurley versus bubble point equal to or below the line defined by the equation log (Gurley)=5.13×10$^{-3}$ (Bubble Point)−1.26 and a product of matrix tensile strengths in two orthogonal directions of at least $1.3 \times 10^5$ MPa².

89. An article comprising a porous PTFE membrane formed by a method comprising forming an extruded lubricated tape of PTFE polymer by a paste forming process;

stretching the extruded lubricated tape transversely at a ratio of at least 3:1, and drying the stretched tape to remove lubricant;

longitudinally expanding the resulting tape at a temperature above 327° C.;

then transversely expanding the tape at a temperature above 327° C., said porous PTFE membrane having a water entry pressure versus Gurley number equal to or above the line defined by the equation WEP=3(Gurley)+2500.

90. An article comprising a porous PTFE membrane formed by a method comprising forming an extruded lubricated tape of PTFE polymer by a paste forming process;

stretching the extruded lubricated tape transversely at a ratio of at least 3:1, and drying the stretched tape to remove lubricant;

longitudinally expanding the resulting tape at a temperature above 327° C.;

then transversely expanding the tape at a temperature above 327° C., said porous PTFE membrane having a water flux rate versus bubble point equal to or above the line defined by the equation log (Water Flux Rate)=$-3.5 \times 10^{-3}$ (Bubble Point)+1.3.

91. An article comprising a porous PTFE membrane formed by a method comprising forming an extruded lubricated tape of PTFE polymer by a paste forming process;

stretching the extruded lubricated tape transversely at a ratio of at least 3:1, and drying the stretched tape to remove lubricant;

longitudinally expanding the resulting tape at a temperature above 327° C.;

then transversely expanding the tape at a temperature above 327° C., said porous PTFE membrane having a water flux rate versus mean flow pore size equal to or above the line defined by the equation log (water flux rate)=16.9 (mean flow pore size)−1.85.

92. An article comprising a composite of at least one porous PTFE membrane and at least one additional layer, said porous PTFE membrane formed by a method comprising forming an extruded lubricated tape of PTFE polymer by a paste forming process;

stretching the extruded lubricated tape transversely at a ratio of at least 3:1, and drying the stretched tape to remove lubricant;

longitudinally expanding the resulting tape at a temperature above 327° C.;

then transversely expanding the tape at a temperature above 327° C., said composite having a water flux rate versus bubble point equal to or above the line defined by the equation log (Water Flux Rate)=$-3.5 \times 10^{-3}$ (Bubble Point)+1.3.

93. An article comprising a composite of at least one porous PTFE membrane and at least one additional layer, said porous PTFE membrane formed by a method comprising forming an extruded lubricated tape of PTFE polymer by a paste forming process;

stretching the extruded lubricated tape transversely at a ratio of at least 3:1, and drying the stretched tape to remove lubricant;

longitudinally expanding the resulting tape at a temperature above 327° C.;

then transversely expanding the tape at a temperature above 327° C., said composite further being instantly wettable with water, said composite having a water flux rate versus bubble point equal to or greater than the line defined by the equation log (Water Flux Rate)=$-0.01$ (Bubble Point)+1.3.

94. An article comprising a porous PTFE membrane formed by a method comprising forming an extruded lubricated tape of PTFE polymer by a paste forming process;

stretching the extruded lubricated tape transversely at a ratio of at least 3:1, and drying the stretched tape to remove lubricant;

longitudinally expanding the resulting tape at a temperature above 327° C.;

then transversely expanding the tape at a temperature above 327° C., said porous PTFE membrane being instantly wettable with water, said membrane having a water flux rate versus bubble point equal to or above the line defined by the equation log (Water Flux Rate)=$-0.01$ (Bubble Point)+1.3.

95. An article comprising at least one porous PTFE membrane formed by a method comprising forming an extruded lubricated tape of PTFE polymer by a paste forming process;

stretching the extruded lubricated tape transversely at a ratio of at least 3:1, and drying the stretched tape to remove lubricant;

longitudinally expanding the resulting tape at a temperature above 327° C.;

then transversely expanding the tape at a temperature above 327° C., said porous PTFE membrane having an oleophobic treatment thereon and an oil rating of at least 2, said article having a water entry pressure above 1250 kPa and a Gurley number of greater than 0 and less than 200 seconds.

96. An article comprising a porous PTFE membrane formed by a method comprising forming an extruded lubricated tape of PTFE polymer by a paste forming process;

stretching the extruded lubricated tape transversely at a ratio of at least 3:1, and drying the stretched tape to remove lubricant;

longitudinally expanding the resulting tape at a temperature above 327° C.;

then transversely expanding the tape at a temperature above 327° C., said porous PTFE membrane having a Gurley versus bubble point equal to or below the line defined by the equation log (Gurley)=$5.13 \times 10^{-3}$ (Bubble Point)−1.22 and a light transmission of at least 50%.

* * * * *

UNITED STATES PATENT AND TRADEMARK OFFICE
CERTIFICATE OF CORRECTION

PATENT NO. : 7,306,729 B2
APPLICATION NO. : 11/334243
DATED : December 11, 2007
INVENTOR(S) : Bacino et al.

It is certified that error appears in the above-identified patent and that said Letters Patent is hereby corrected as shown below:

Column 22, line 6: change "$10^6$" to --$10^5$--

Signed and Sealed this

Eighth Day of July, 2008

JON W. DUDAS
*Director of the United States Patent and Trademark Office*